(12) United States Patent
Suzuki et al.

(10) Patent No.: US 10,299,308 B2
(45) Date of Patent: May 21, 2019

(54) TERMINAL DEVICE, COMMUNICATION METHOD, AND INTEGRATED CIRCUIT

(71) Applicant: SHARP KABUSHIKI KAISHA, Sakai, Osaka (JP)

(72) Inventors: Shoichi Suzuki, Sakai (JP); Tatsushi Aiba, Sakai (JP); Kazunari Yokomakura, Sakai (JP); Hiroki Takahashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/750,269

(22) PCT Filed: Aug. 2, 2016

(86) PCT No.: PCT/JP2016/072620
§ 371 (c)(1),
(2) Date: Feb. 5, 2018

(87) PCT Pub. No.: WO2017/026322
PCT Pub. Date: Feb. 16, 2017

(65) Prior Publication Data
US 2018/0235023 A1    Aug. 16, 2018

(30) Foreign Application Priority Data
Aug. 7, 2015 (JP) ................. 2015-156691

(51) Int. Cl.
*H04W 76/15* (2018.01)
*H04W 72/04* (2009.01)
*H04L 5/00* (2006.01)

(52) U.S. Cl.
CPC ........... *H04W 76/15* (2018.02); *H04L 5/0035* (2013.01); *H04L 5/0053* (2013.01); *H04W 72/04* (2013.01); *H04W 72/0413* (2013.01); *H04W 72/0446* (2013.01)

(58) Field of Classification Search
CPC .................................................... H04W 76/15
See application file for complete search history.

(56) References Cited

U.S. PATENT DOCUMENTS

| | | | | |
|---|---|---|---|---|
| 2013/0094410 A1* | 4/2013 | Yang | ...................... | H04L 1/1854 370/280 |
| 2014/0092865 A1* | 4/2014 | Heo | ......................... | H04W 4/70 370/331 |
| 2014/0334419 A1* | 11/2014 | Yang | ...................... | H04L 1/1861 370/329 |

OTHER PUBLICATIONS

Nokia Corporation et al., "New WI proposal: LTE Carrier Aggregation Enhancement Beyond 5 Carriers", RP-142286, 3GPP TSG RAN Meeting #66, Hawaii, (US), Dec. 8-11, 2014.

(Continued)

*Primary Examiner* — Rebecca E Song
*Assistant Examiner* — Golam Rabbane
(74) *Attorney, Agent, or Firm* — ScienBiziP, P.C.

(57) ABSTRACT

A terminal device and a base station device efficiently communicate with each other by using multiple cells. The terminal device selects a PUCCH resource used to transmit an SR, from a first PUCCH resource in a first cell and a second PUCCH resource in a second cell, and transmits the SR by using the selected PUCCH resource in a first subframe. In a case that a first PUCCH not including a transport block in the first subframe is transmitted in the first cell, the second PUCCH resource in the first subframe is selected.

2 Claims, 6 Drawing Sheets

(56) References Cited

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 12)"3GPP TS 36.321 v12.5.0 (Mar. 2015)", Mar. 27, 2015.Valbonne-France.

3rd Generation Partnership Project; Technical Specification Group Radio Access Network; Evolved Universal Terrestrial Radio Access (E-UTRA); Physical channels and modulation (Release 12)"3GPP TS 36.211 V12.5.0 (Mar. 2015)", Mar. 26, 2015.

3rd Generation Partnership Project; Technical Specification Group Radio Access Network; Evolved Universal Terrestrial Radio Access (E-UTRA); Multiplexing and channel coding (Release 12)"3GPP TS 36.212 V12.4.0 (Mar. 2015)", Mar. 26, 2015.

3rd Generation Partnership Project; Technical Specification Group Radio Access Network; Evolved Universal Terrestrial Radio Access (E-UTRA); Physical layer procedures (Release 12)"3GPP TS 36.213 V12.5.0 (Mar. 2015)", Mar. 26, 2015.

\* cited by examiner

TERMINAL DEVICE, COMMUNICATION METHOD, AND INTEGRATED CIRCUIT

TECHNICAL FIELD

The present invention relates to a terminal device, a communication method, and an integrated circuit.

This application claims priority based on Japanese Patent Application No. 2015-156691 filed in Japan on Aug. 7, 2015, the contents of which are incorporated herein by reference.

BACKGROUND ART

In the 3rd Generation Partnership Project (3GPP), a radio access method and a radio network for cellular mobile communications (hereinafter, referred to as "Long Term Evolution (UTE)", or "Evolved Universal Terrestrial Radio Access (EUTRA)") have been studied. In LTE, a base station device is also referred to as an evolved NodeB (eNodeB), and a terminal device is also referred to as User Equipment (UE). LTE is a cellular communication system in which an area is divided into multiple cells to form a cellular pattern, each of the cells being served by a base station device. A single base station device may manage multiple cells.

In 3GPP, career aggregation has been specified which allows a terminal device to perform simultaneous transmission and/or reception in up to five serving cells (component careers).

In 3GPP, a configuration where a terminal device performs simultaneous transmission and/or reception in more than five serving cells (component careers) has been considered (NPL 1). Furthermore, a configuration where a terminal device transmits a physical uplink control channel in a secondary cell which is a serving cell other than a primary cell has been considered (NPL 1).

CITATION LIST

Patent Literature

NPL 1: "New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, 8-11 Dec. 2014.
NPL 2: "3GPP TS 36.321 v12.5.0 (2015 March)", 27 Mar. 2015.
NPL 3: "3GPP TS 36.211 V12.5.0 (2015 March)", 26 Mar. 2015.
NPL 4: "3GPP TS 36.212 V12.4.0 (2015 March)", 26 Mar. 2015.
NPL 5: "3GPP TS 36.213 V12.5.0 (2015 March)", 26 Mar. 2015.

DISCLOSURE OF THE INVENTION

Problems to be Solved by the Invention

However, a specific method of transmitting a scheduling request from a terminal device to a base station device in a case that a physical uplink control channel is transmitted in a secondary cell, which is a serving cell other than a primary cell, is not sufficiently considered.

The present invention provides a terminal device which can efficiently communicate with a base station device by using multiple cells (component carriers), a communication method used by the terminal device, an integrated circuit mounted on the terminal device, the base station device which communicates with the terminal device, an integrated circuit mounted on the base station device, and a communication method used by the base station device.

Means for Solving the Problems (1) According to some aspects of the present disclosure, the following measures are provided. Specifically, A first aspect of the present disclosure is a terminal device including: a selection unit configured to select a physical uplink control channel resource used to transmit a scheduling request, from a first physical uplink control channel resource in a first subframe in a first serving cell and a second physical uplink control channel resource in the first subframe in a second serving cell; and a transmission unit configured to transmit the scheduling request by using the physical uplink control channel resource that has been selected and a physical uplink control channel format 1, in the first subframe, and in a case that a first physical uplink shared channel not including a transport block in the first serving cell in the first subframe is transmitted and a second physical uplink shared channel not including a transport block in the second serving cell in the first subframe is not transmitted, the second physical uplink control channel resource in the first subframe in the second serving cell is selected as a physical uplink control channel resource used to transmit the scheduling request.

(2) A second aspect of the present disclosure is a communication method used by a terminal device, the communication method including: selecting a physical uplink control channel resource used to transmit a scheduling request, from a first physical uplink control channel resource in a first subframe in a first serving cell and a second physical uplink control channel resource in the first subframe in a second serving cell; and transmitting the scheduling request by using the physical uplink control channel resource that has been selected and a physical uplink control channel format 1, in the first subframe, and in a case that a first physical uplink shared channel not including a transport block in the first serving cell in the first subframe is transmitted and a second physical uplink shared channel not including a transport block in the second serving cell in the first subframe is not transmitted, the second physical uplink control channel resource in the first subframe in the second serving cell is selected as a physical uplink control channel resource used to transmit the scheduling request.

(3) A third aspect of the present disclosure is an integrated circuit to be implemented in a terminal device, the integrated circuit including: a selection circuit configured to select a physical uplink control channel resource used to transmit a scheduling request, from a first physical uplink control channel resource in a first subframe in a first serving cell and a second physical uplink control channel resource in the first subframe in a second serving cell; and a transmission circuit configured to transmit the scheduling request by using the physical uplink control channel resource that has been selected and a physical uplink control channel format 1, in the first subframe, and in a case that a first physical uplink shared channel not including a transport block of the first serving cell in the first subframe is transmitted, and a second physical uplink shared channel not including a transport block in the second serving cell in the first subframe is not transmitted, the second physical uplink control channel resource in the first subframe in the second serving cell is selected as a physical uplink control channel resource used to transmit the scheduling request.

Effects of the Invention

According to the present invention, the terminal device can efficiently communicate with the base station device by using multiple cells (component carriers).

MODE FOR CARRYING OUT THE INVENTION

Embodiments of the present invention will be described below.

Figure 1:
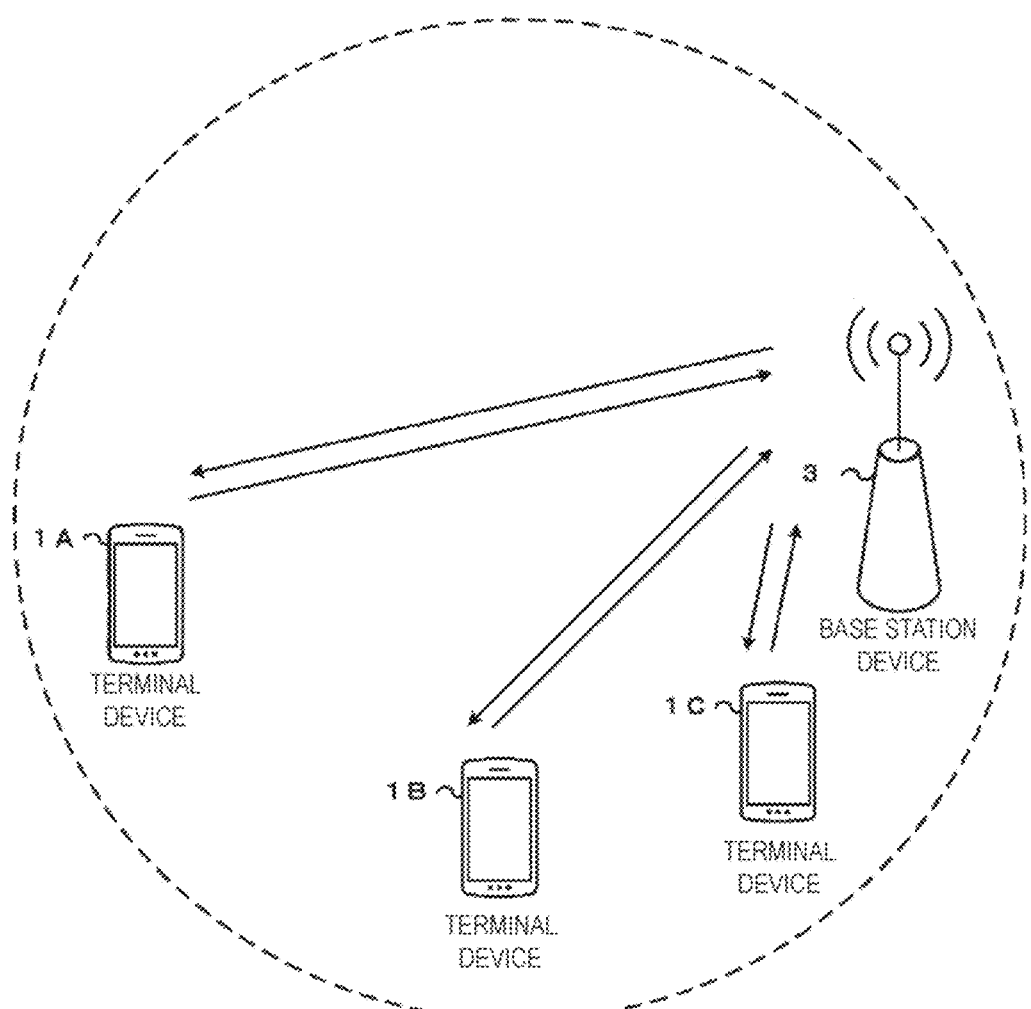
FIG. 1 is a conceptual diagram of a radio communication system according to the present embodiment.

FIG. 1 is a conceptual diagram of a radio communication system according to the present embodiment. In FIG. 1, the radio communication system includes terminal devices 1A to 1C and a base station device 3. Each of the terminal devices 1A to 1C is referred to as a terminal device 1 below.

Carrier aggregation will be described below.

In the present embodiment, multiple serving cells are configured for a terminal device 1. A technology in which the terminal device 1 communicates via the multiple cells is referred to as cell aggregation or carrier aggregation. The present invention may be applied to each of the multiple serving cells configured for the terminal device 1. Furthermore, the present invention may be applied to some of the configured multiple serving cells. Furthermore, the present invention may be applied to each of groups of the configured multiple serving cells. Furthermore, the present invention may be applied to some of the groups of the configured multiple serving cells. According to carrier aggregation, the configured multiple serving cells are also referred to as "aggregated serving cells".

Time Division Duplex (TDD) and/or Frequency Division Duplex (FDD) is applied to a radio communication system according to the present embodiment. For cell aggregation, TDD may be applied to all multiple serving cells. Alternatively, serving cells to which TDD is applied and serving cells to which FDD is applied may be aggregated.

The configured multiple serving cells include one primary cell and one or multiple secondary cells. The primary cell is a serving cell in which an initial connection establishment procedure has been performed, a serving cell in which a connection re-establishment procedure has been started, or a cell indicated as a primary cell during a handover procedure. At the point in time when a Radio Resource Control (RRC) connection is established, or later, a secondary cell may be configured.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal device 1 can perform simultaneous transmission and/or reception on multiple physical channels in multiple serving cells (component careers). A single physical channel is transmitted in a single serving cell (component carrier) of the multiple serving cells (component carriers).

In the present embodiment, a secondary cell used for transmission on a Physical Uplink Control Channel (PUCCH) is referred to as a PUCCH secondary cell. In the present embodiment, a secondary cell not used for the transmission of the PUCCH is referred to as a non-PUCCH secondary cell, a non-PUCCH serving cell, or a non-PUCCH cell. The primary cell and the PUCCH secondary cell are collectively referred to as a PUCCH serving cell and PUCCH The PUCCH serving cell (the primary cell, the PUCCH secondary cell) includes the downlink component carrier and the uplink component carrier. A resource for PUCCH is configured in the PUCCH serving cell (the primary cell, the PUCCH secondary cell).

The non-PUCCH serving cell (non-PUCCH secondary cell) may include only the downlink component carrier. The non-PUCCH serving cell (non-PUCCH secondary cell) may include the downlink component carrier and the uplink component carrier.

The terminal device 1 performs PUCCH transmission on the PUCCH serving cell. The terminal device 1 performs transmission on the PUCCH in the primary cell. Moreover, the terminal device 1 performs PUCCH transmission on the PUCCH secondary cell. Moreover, the terminal device 1 performs PUCCH transmission on the non-PUCCH secondary cell.

Note that, the PUCCH secondary cell may be defined as a serving cell that is neither a primary cell nor a secondary cell.

Physical channels and physical signals according to the present embodiment will be described.

In FIG. 1, in uplink radio communication from the terminal device 1 to the base station device 3, the following uplink physical channels are used. The uplink physical channels are used to transmit information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes: downlink Channel State Information (CSI); a Scheduling Request (SR) used to request for a PUSCH (Uplink-Shared Channel: UL-SCH) resource for initial transmission; and a Hybrid Automatic Repeat request ACKnowledgement (HARQ-ACK) for downlink data (a Transport block, a Medium Access Control Protocol Data Unit (MAC PDU), a Downlink-Shared Channel (DL-SCH), or a Physical Downlink Shared Channel (PDSCH)). The HARQ-ACK indicates an acknowledgement (ACK) or a negative-acknowledgement (NACK). The HARQ-ACK is also referred to as ACK/

NACK, HARQ feedback, HARQ acknowledge, HARQ information, or HARQ control information.

The scheduling request includes a positive scheduling request or a negative scheduling request. The positive scheduling request indicates to request a UL-SCH resource for initial transmission. The negative scheduling request indicates not to request the UL-SCH resource for the initial transmission.

PUCCH format 1 is used to transmit the positive scheduling request. PUCCH format 1a is used to transmit 1-bit HARQ-ACK. PUCCH format 1b is used to transmit 2-bit HARQ-ACK. PUCCH format 1b with channel selection is used to transmit the HARQ-ACK up to four bits in a case that more than one serving cells are configured to the terminal device. PUCCH format 3 may be used to transmit only HARQ-ACK. PUCCH format 3 may be used to transmit the HARQ-ACK and the scheduling request (the positive scheduling request or the negative scheduling request). PUCCH format 3 may be used to transmit HARQ-ACK, channel state information, and the scheduling request (the positive scheduling request or the negative scheduling request).

The PUSCH is used to transmit uplink data (Uplink-Shared Channel (UL-SCH)). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information.

Here, the base station device 3 and the terminal device 1 communicate a signal in (transmit and/or receive a signal to and from) the higher layer. For example, the base station device 3 and the terminal device 1 may transmit and/or receive RRC signaling (also referred to as an Radio Resource Control message (RRC message), Radio Resource Control information (RRC information)) in a Radio Resource Control (RRC) layer. The base station device 3 and the terminal device 1 may transmit and/or receive, in a Medium Access Control (MAC) layer, a MAC CE. Here, the RRC signaling and/or the MAC CE is also referred to as higher layer signaling.

The PUSCH is used to transmit the RRC signaling and the MAC CE. Here, the RRC signaling transmitted from the base station device 3 may be signaling shared by multiple terminal devices 1 on a cell. The RRC signaling transmitted from the base station device 3 may be signaling dedicated to a certain terminal device 1 (also referred to as dedicated signaling). In other words, user device-specific (user device-unique) information is transmitted using the signaling dedicated to a certain terminal device 1.

The PRACH is used to transmit a random access preamble. The PRACH is used for the initial connection establishment procedure, the handover procedure, the connection re-establishment procedure, synchronization (timing adjustment) for uplink transmission, and the request for the PUSCH resource.

In FIG. 1, the following uplink physical signal is used in the uplink radio communication. The uplink physical signal is not used to transmit information output from the higher layer, but is used by a physical layer.

Uplink Reference Signal (UL RS)

According to the present embodiment, the following two types of uplink reference signals are used.

Demodulation Reference Signal (DMRS)

Sounding Reference Signal (SRS)

The DMRS is associated with transmission of the PUSCH or the PUCCH. The DMRS is time-multiplexed with the PUSCH or the PUCCH. The base station device 3 uses the DMRS in order to perform channel compensation of the PUSCH or the PUCCH. Transmission of both the PUSCH and the DMRS is hereinafter referred to simply as transmission of the PUSCH. Transmission of both the PUCCH and the DMRS is hereinafter referred to simply as transmission of the PUCCH.

The SRS is not associated with the transmission of the PUSCH or the PUCCH. The base station device 3 uses the SRS in order to measure an uplink channel state.

In FIG. 1, the following downlink physical channels are used for downlink radio communication from the base station device 3 to the terminal device 1. The downlink physical channels are used to transmit the information output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used to broadcast a Master Information Block (MIB), or a Broadcast Channel (BCH), that is shared by the terminal devices 1.

The PCFICH is used to transmit information indicating a region (OFDM symbols) to be used for transmission of the PDCCH.

The PHICH is used to transmit an HARQ indicator (HARQ feedback or response information) indicating an ACKnowledgement (ACK) or a Negative ACKnowledgement (NACK) with respect to the uplink data (Uplink Shared Channel (UL-SCH)) received by the base station device 3.

The PDCCH and the EPDCCH are used to transmit Downlink Control Information (DCI). The downlink control information is also referred to as a DCI format. The downlink control information includes DCI format 3, DCI format 3A, a downlink grant and an uplink grant. The downlink grant is also referred to as downlink assignment or downlink allocation.

The downlink grant is used for scheduling of a single PDSCH within a single cell. The downlink grant is used for scheduling of the PDSCH within the same subframe as the subframe in which the downlink grant is transmitted.

The uplink grant is used for scheduling of a single PUSCH within a single cell. The uplink grant is used for scheduling of a single PUSCH within the fourth or later subframe from the subframe in which the uplink grant is transmitted. The uplink grant includes a TPC command for the PUSCH.

The CRC parity bits attached to a downlink grant or an uplink grant are scrambled with a Cell-Radio Network Temporary Identifier (C-RNTI) or a Semi Persistent Scheduling Cell-Radio Network Temporary Identifier (SPS C-RNTI). The C-RNTI and the SPS C-RNTI are identifiers for identifying a terminal device within a cell.

The C-RNTI is used to control the PDSCH or the PUSCH in a single subframe. The SPS C-RNTI is used to periodically allocate a resource for the PDSCH or the PUSCH.

The PDSCH is used to transmit downlink data (Downlink Shared CHannel (DL-SCH)).

The PMCH is used to transmit multicast data (Multicast CHannel (MCH)).

In FIG. 1, the following downlink physical signals are used in the downlink radio communication. The downlink physical signals are not used to transmit the information output from the higher layer, but are used by the physical layer.

Synchronization signal (SS)
Downlink Reference Signal (DL RS)

The synchronization signal is used in order for the terminal device 1 to be synchronized in terms of frequency and time domains for downlink. In the TDD scheme, the synchronization signal is mapped to subframes 0, 1, 5, and 6 within a radio frame. In the FDD scheme, the synchronization signal is mapped to subframes 0 and 5 within the radio frame.

The downlink reference signal is used in order for the terminal device 1 to perform the channel compensation of the downlink physical channel. The downlink reference signal is used in order for the terminal device 1 to calculate the downlink channel state information.

According to the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Channel State Information-Reference Signal (NZP CSI-RS)
Zero Power Chanel State Information-Reference Signal (ZP CSI-RS)
Multimedia Broadcast and Multicast Service over Single Frequency Network Reference Signal (MBSFN RS)
Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in the Medium Access Control (MAC) layer is referred to as a transport channel. The unit of the transport channel used in the MAC layer is referred to as a Transport Block (TB) or a MAC Protocol Data Unit (PDU). Control of a Hybrid Automatic Repeat reQuest (HARQ) is performed for each transport block in the MAC layer. The transport block is a unit of data that the MAC layer delivers to the physical layer. In the physical layer, the transport block is mapped to a codeword, and coding processing is performed on a codeword-by-codeword basis.

In the present embodiment, a random access procedure may be performed in the primary cell and the secondary cell. The random access procedure includes a contention based random access procedure and a non-contention based random access procedure. The secondary cell does not support the contention based random access procedure. The PUCCH secondary cell does not support the contention based random access procedure.

In the primary cell, the PRACH may be transmitted. The terminal device 1 receives from the base station device 3 information (RRC message) on the random access procedure in the primary cell. The information on the random access procedure in the primary cell includes information indicating a set of PRACH resources in the primary cell.

In the secondary cell, the PRACH may be transmitted. The terminal device 1 receives from the base station device 3 the information (RRC message) on the random access procedure in the secondary cell. The information on the random access procedure in the secondary cell includes information indicating PRACH resources in the secondary cell.

In the present embodiment, a group of multiple serving cells is referred to as a PUCCH cell group. A serving cell belongs to any one of the PUCCH cell groups.

One PUCCH cell group includes one PUCCH serving cell. One PUCCH cell group may include only one PUCCH serving cell. One PUCCH cell group may include one PUCCH serving cell, and one or multiple non-PUCCH serving cells.

A PUCCH cell group including the primary cell is referred to as a primary PUCCH cell group. A PUCCH cell group not including the primary cell is referred to as a secondary PUCCH cell group. In other words, the secondary PUCCH cell group includes the PUCCH secondary cell.

An index for identifying the PUCCH cell group (a cell group index) may be defined. The index for the primary PUCCH cell group is always zero. The index for the secondary PUCCH cell group may be configured by a network device (the base station device 3).

The PUCCH of the PUCCH serving cell is used in order to transmit uplink control information (the HARQ-ACK and/or the CSI) with respect to the serving cell (the PUCCH serving cell, the non-PUCCH serving cell) included in the PUCCH cell group to which the PUCCH serving cell belongs.

In other words, the uplink control information (HARQ-ACK and/or CSI) with respect to a serving cell (PUCCH serving cell, non-PUCCH serving cell) included in the PUCCH cell group is transmitted using the PUCCH on the PUCCH serving cell included in the PUCCH cell group.

For example, the uplink control information (HARQ-ACK and/or CSI) with respect to a serving cell included in the primary PUCCH cell group is transmitted using the PUCCH on the PUCCH serving cell included in the primary PUCCH cell group.

The scheduling request may be transmitted in one PUCCH serving cell of multiple PUCCH serving cells. In part or all of the multiple PUCCH serving cells, transmission of multiple scheduling requests may coincide in time. Each of the scheduling requests may be transmitted via the PUCCH in the primary cell. Each of the scheduling requests may be transmitted via the PUCCH in the PUCCH secondary cell.

PUCCH resource(s) for the scheduling request(s) is configured to part or all of the multiple PUCCH serving cells. The PUCCH resource(s) for the scheduling request(s) is configured per PUCCH serving cell by the higher layer. The base station device 3 transmits to the terminal device 1 information (RRC message) indicating the PUCCH resource(s) for the scheduling request(s). In the PUCCH resource(s) for the scheduling request(s), PUCCH format 1 is transmitted. An uplink subframe including the PUCCH resource(s) for the scheduling request(s) is referred to as a "scheduling request transmission instance". Scheduling request transmission instances are periodic uplink subframes. The PUCCH resource(s) for the scheduling request(s) is the PUCCH resource(s) for transmitting the scheduling request(s) by using PUCCH format 1. The PUCCH resource(s) for the scheduling requests) is also referred to as "PUCCH format 1 resources)". Note that, the scheduling request(s) may be transmitted by using a PUCCH resource other than the PUCCH resource (PUCCH format 1 resource) for the scheduling request, and a PUCCH format other than PUCCH format 1.

The scheduling request transmission instance is configured per PUCCH serving cell by the higher layer. The information (RRC message) indicating the PUCCH resource for the scheduling request may include information indicating the scheduling request transmission instance. That is, the information indicating the scheduling request transmission instance is defined per PUCCH serving cell. The information indicating the scheduling request transmission instance indicates a periodicity and an offset. A subframe is also referred to as a Transmission Time Interval (TTI).

Figure 2:
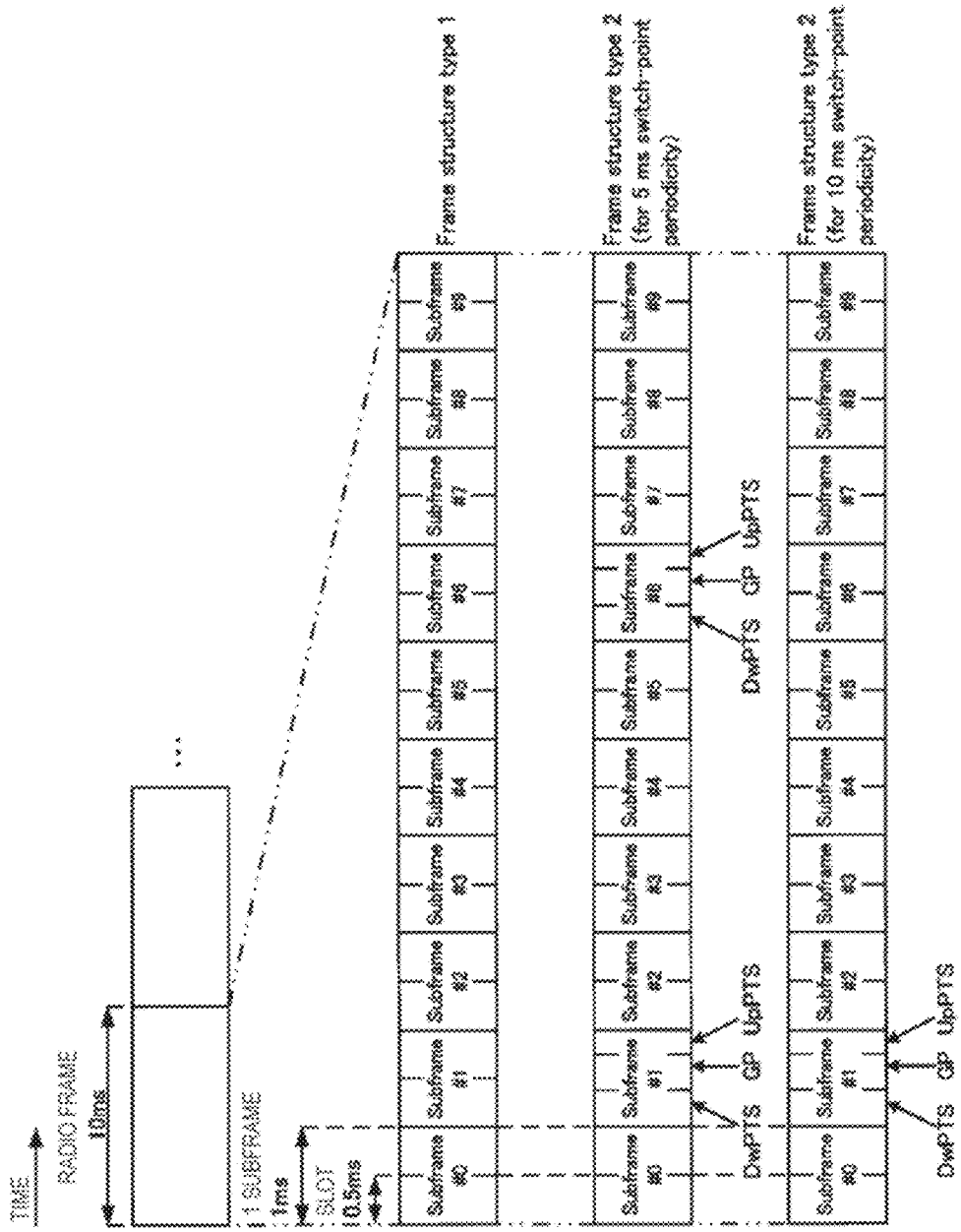
FIG. 2 is a diagram illustrating a schematic configuration of a radio frame according to the present embodiment.

FIG. 2 is a diagram illustrating a schematic configuration of the radio frame according to the present embodiment. In FIG. 2, the horizontal axis is a time axis. Each of radio frames of type 1 and type 2 is 10 ms in length, and is defined by 10 subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot.

Following three types of subframes are defined for frame structure type 2.

Downlink subframe
Uplink subframe
Special subframe

The downlink subframe is a subframe reserved for the downlink transmission. The uplink subframe is a subframe reserved for the uplink transmission. The special subframe is constituted of three fields. The three fields are a Downlink Pilot Time Slot (DwPTS), a Guard Period (GP), and an Uplink Pilot Time Slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may be constituted of only the DwPTS and the GP, or may be constituted of only the GP and the UpPTS.

A radio frame of frame structure type 2 is constituted of at least the downlink subframe, the uplink subframe, and the special subframe. The constitution of the radio frame of frame structure type 2 is indicated by an uplink-downlink configuration (UL-DL configuration). The terminal device 1 receives information indicating the UL-DL configuration from the base station device 3.

According to FDD, all subframes are downlink subframes. According to FDD all subframes are uplink subframes.

Figure 3:
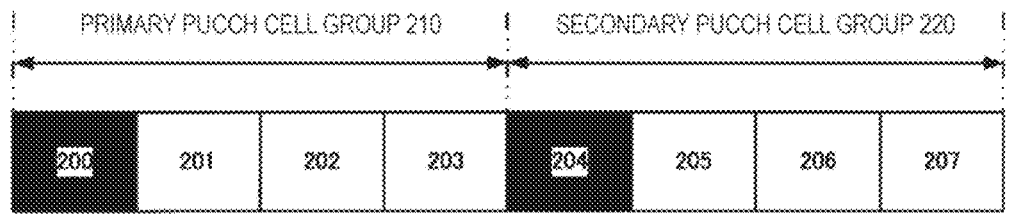
FIG. 3 is a diagram illustrating one example of PUCCH cell groups according to the present embodiment.

FIG. 3 is a diagram illustrating one example of PUCCH cell groups according to the present embodiment.

In FIG. 3, each of squares assigned 200 to 207 represents a serving cell to be aggregated. In FIG. 3, the serving cell 200 is a primary cell, and the serving cells 201 to 207 are secondary cells. In FIG. 3, the serving cells 200 and 204 are PUCCH serving cells, and the serving cells 201, 202, 203, 205, 206 and 207 are non-PUCCH serving cells.

In FIG. 3, the PUCCH cell group includes a primary PUCCH cell group 210 and a secondary PUCCH cell group 220. The primary PUCCH cell group 210 includes the serving cells 200 to 203. A HARQ-ACK for the serving cells 200 to 203 included in the primary PUCCH cell group 210 may be transmitted by using the PUCCH on the serving cell 200. The HARQ-ACK for the serving cells 200 to 203 included in the primary PUCCH cell group 210 may be transmitted by using the PUSCH on one of the serving cells 200 to 203. In a certain subframe, the HARQ-ACK for the serving cells 200 to 203 included in the primary PUCCH cell group 210 is transmitted on one physical channel.

The secondary PUCCH cell group 220 includes the serving cells 204 to 207. A HARQ-ACK for the serving cells 204 to 207 included in the secondary PUCCH cell group 220 may be transmitted by using the PUCCH on the serving cell 204. The HARQ-ACK for the serving cells 204 to 207 included in the secondary PUCCH cell group 220 may be transmitted by using the PUSCH on one of the serving cells 204 to 207. In a certain subframe, the HARQ-ACK for the serving cells 204 to 207 included in the secondary PUCCH cell group 210 is transmitted on one physical channel.

In a certain subframe, transmission of the HARQ-ACK for the serving cells 200 to 203 included in the primary PUCCH cell group 210, and transmission of the HARQ-ACK of the serving cells 204 to 207 included in the secondary PUCCH cell group 220 may coincide in time.

In the present embodiment, the phrase that "X and Y coincide in time in a subframe" is a synonym of phrase that "Y takes place in a subframe in which X takes place". In addition, in the subframe, the X and Y may coincide in time in the time domain or may not coincide in time in the time domain. In addition, the X and Y may partially or entirely overlap or may not overlap in the time domain.

In FIG. 3, the scheduling request may be transmitted by using the PUCCH on one of the serving cells 200 and 204.

Hereinafter, processing associated with a scheduling request will be described.

In a case that the scheduling request is triggered, the scheduling request is regarded to be pending until the scheduling request is canceled. In a case that the scheduling request is triggered, and there is no other pending scheduling request, the terminal device 1 sets a counter SR_COUNTER to 0.

Figure 4:
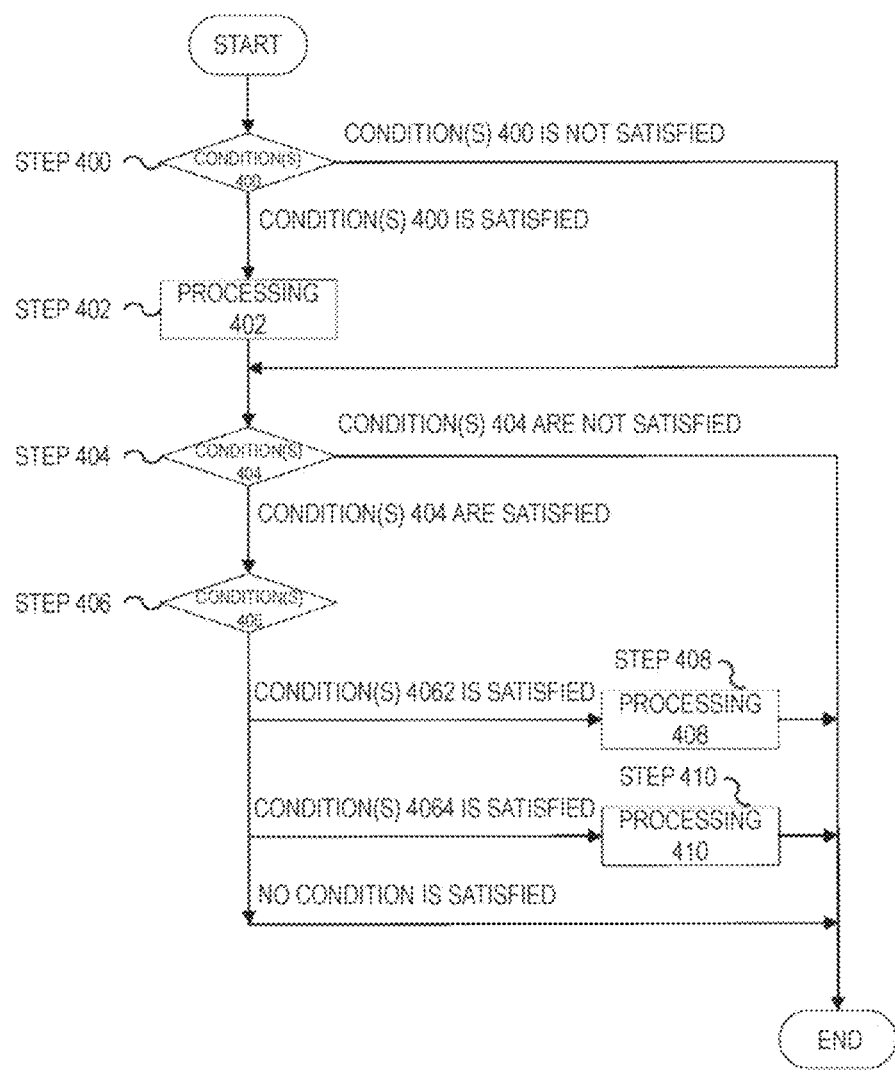
FIG. 4 is a diagram illustrating an example of processing associated with a scheduling request performed on each subframe (TTI) according to the present embodiment.

FIG. 4 is a diagram illustrating an example of processing associated with a scheduling request performed on each subframe (TTI) in the present embodiment. The processing in FIG. 4 is performed in a MAC layer. While at least one scheduling request is pending, the terminal device 1 performs the processing in FIG. 4 on each subframe including no UL-SCH available for transmission. The MAC layer does not instruct the physical layer to signal the scheduling request by using the PUCCH in the subframe including the UL-SCH available for transmission. Note that, specific processing is not limited to the processing in FIG. 4, and also includes processing, which is changed by replacing, adding and removing the steps or the like without departing from the scope of the present invention. Furthermore, the processing in FIG. 4 can be variously modified within the scope defined by claims, and embodiments that are made by suitably combining technical means disclosed are also included in the technical scope of the present invention.

In step 400, the terminal device 1 determines whether condition(s) included in condition(s) 400 is satisfied. In a case that the condition(s) included in the condition(s) 400 is satisfied in step 400, the terminal device 1 proceeds to step 402. In a case that the condition(s) included in the condition (s) 400 is not satisfied in step 400, the terminal device 1 proceeds to step 404. The condition(s) 400 include at least a condition that the terminal device 1 does not include a valid PUCCH resource for a scheduling request configured in any subframe on any serving cell. In other words, the condition(s) 400 include at least a condition that the PUCCH resource is not configured in any serving cell. In this regard, the valid PUCCH resources do not include the PUCCH resource in a deactivated secondary cell.

In step 402, the terminal device 1 performs processing 402, and proceeds to step 404. The processing 402 includes at least processing of initiating a random access procedure in a primary cell, and processing of canceling all pending scheduling requests.

In step 404, the terminal device 1 determines whether condition(s) included in condition(s) 404 is satisfied. In a case that the condition(s) included in the condition(s) 404 is satisfied in step 404, the terminal device 1 proceeds to step 406. In a case that the condition(s) included in the conditions 404 is not satisfied in step 404, the terminal device 1 terminates the processing on this TTI. The condition(s) 404 include at least a condition that this subframe includes a valid PUCCH resource for a scheduling request configured on one of serving cells, a condition that this subframe is not part of a measurement gap, and a condition that a timer sr-ProhibitTimer is not running. In other words, the condition(s) 404 include at least a condition that, in this subframe, the valid PUCCH resource for the scheduling request is configured on one of serving cells, and the serving cell is activated.

In step 406, the terminal device 1 determines whether condition(s) included in condition(s) 406 is satisfied. In a case that no condition included in the condition(s) 406 is satisfied in step 406, the terminal device 1 terminates the processing on this TTI. The conditions 406 include condition(s) 4062 and condition(s) 4604.

In a case that condition(s) included in the condition(s) 4062 is satisfied in step 406, the terminal device 1 proceeds to step 408. The condition(s) 4062 include at least a condition that a value of a counter SR_COUNTER is smaller than a prescribed value dsr-TransMax.

In step 408, the terminal device 1 performs processing 408. The processing 408 includes at least processing of incrementing the value of the counter SR_COUNTER by one, processing of announcing/instructing the physical layer signal a scheduling request by using a PUCCH, and processing of starting the timer sr-ProhibitTimer.

The prescribed value dsr-TransMax may be controlled by the base station device 3. The base station device 3 may transmit information indicating the prescribed value dsr-TransMax to the terminal device 1. A default value of the prescribed value dsr-TransMax may be defined in advance.

In a case that condition(s) included in the condition(s) 4064 is satisfied in step 406, the terminal device 1 proceeds to step 410. The condition(s) 4064 include at least a condition that the value of the counter SR_COUNTER is the same as the prescribed value dsr-TransMax or is larger than the prescribed value dsr-TransMax.

In step 410, the terminal device 1 performs processing 410. The processing 410 includes at least processing of announcing/instructing to an RRC a PUCCH/SRS for all serving cells to release, processing of clearing a configured downlink assignment and a configured uplink assignment, processing of initiating the random access procedure in the primary cell, and processing of canceling all pending scheduling requests. The PUCCHs for all serving cells may include PUCCHs for a CSI, PUCCHs for a HARQ-ACK and/or PUCCHs for scheduling requests. The uplink assignment is semi-statically configured.

The RRC layer releases the PUCCH/SRS for all or part of serving cells based on the announcement/instruction from the MAC layer. In other words, the RRC releases PUCCH/SRS resources for all or part of serving cells based on the instruction from the MAC layer. In the present embodiment, the RRC layer and the MAC layer are also referred to as "higher layers".

The physical layer signals a scheduling request by using the PUCCH based on the announcement/instruction from the MAC layer. The physical layer transmits the scheduling request by using the PUCCH based on the instruction from the MAC layer. In the present embodiment, "transmitting a scheduling request by using a PUCCH based on an instruction from the MAC layer" is synonymously used to "a scheduling request takes place".

In a case that, in multiple PUCCH serving cells of scheduling request transmission instances instructed by the MAC layer to signal scheduling requests by using the PUCCH, the multiple PUCCH resources for the scheduling requests are configured, the physical layer and/or the MAC layer selects the PUCCH resource from the multiple PUCCH resources of the scheduling request transmission instances. The physical layer may transmit a scheduling request by using the selected PUCCH resource and PUCCH format 1 in the scheduling request transmission instance. The physical layer does not transmit the scheduling request by using the multiple PUCCH resources except the selected PUCCH resource, and PUCCH format 1 in the scheduling request transmission instance. The physical layer may not transmit the scheduling request by using the selected PUCCH resource and PUCCH format 1 in the scheduling request transmission instance, and may transmit the scheduling request by using the PUCCH resource for a HARQ-ACK and PUCCH format 3.

In a case that only a positive scheduling request is transmitted in a certain subframe, the terminal device 1 transmits the positive scheduling request by using the PUCCH resource for the scheduling request and PUCCH format 1 in the certain subframe.

In a case that transmission of the scheduling request takes place in a subframe in which transmission of PUCCH format 1a/1b (PUCCH format 1a or PUCCH format 1b) is performed, and that the scheduling request is a negative scheduling request, the terminal device 1 transmits the HARQ-ACK by using the PUCCH resource for the HARQ-ACK.

In a case that the transmission of the scheduling request takes place in a subframe in which the transmission of PUCCH format 1a/1b is performed, and that the scheduling request is the positive scheduling request and transmission of a HARQ-ACK and the transmission of the scheduling request take place in different serving cells, the terminal device 1 may transmit the positive scheduling request by using the PUCCH resource for the scheduling request and PUCCH format 1, and transmit the HARQ-ACK by using the PUCCH resource for the HARQ-ACK.

In a case that the transmission of the scheduling request takes place in a subframe in which the transmission of PUCCH format 1a/1b is performed, and that the scheduling request is the positive scheduling request and both of transmission of a HARQ-ACK and the transmission of the scheduling request take place in the same serving cell, the terminal device 1 may transmit the HARQ-ACK by using the PUCCH resource for the HARQ scheduling request.

In a case that the transmission of the scheduling request takes place in a subframe in which the transmission of PUCCH format 1b with channel selection is performed, and that the scheduling request is the negative scheduling request, the terminal device 1 transmits the HARQ-ACK by using the PUCCH resource for the HARQ-ACK.

In a case that the transmission of the scheduling request takes place in a subframe in which the transmission of PUCCH format 1b with channel selection is performed, and that the scheduling request is the positive scheduling request and transmission of a HARQ-ACK and the transmission of the scheduling request take place in different serving cells, the terminal device 1 may transmit the positive scheduling request by using the PUCCH resource for the scheduling request and PUCCH format 1, and transmit the HARQ-ACK by using the PUCCH resource for the HARQ-ACK for each serving cell.

In a case that the transmission of the scheduling request takes place in a subframe in which the transmission of PUCCH format 1b with channel selection is performed, and that the scheduling request is the positive scheduling request and both of transmission of a HARQ-ACK and the transmission of the scheduling request take place in the same serving cell, the terminal device 1 may transmit a 1-bit HARQ-ACK (HARQ-ACK indicated by using 1-bit information) by using the PUCCH resource for the scheduling request. In other words, in a case that, for example, information bits of two bits (b(0) and b(1)) are transmitted by using the PUCCH resource for the scheduling request, each of the information bits of the two bits (b(0) and b(1)) is associated with one serving cell.

In a case that one transport block or only a PDCCH/EPDCCH for instructing one downlink Semi Persistent Scheduling (SPS) release is detected in a serving cell, the 1-bit HARQ-ACK for the serving cells is a bit of the HARQ-ACK associated with the one transport block or the PDCCH/EPDCCH for instructing the one downlink SPS release. In a case that two transport blocks are received in a serving cell, the 1-bit HARQ-ACK for the serving cell is generated by spatially bundling the two HARQ-ACK bits associated with the two transport blocks. The bundling is performed by a logical OR operation. In a case that none of the PDSCH transmission to which a HARQ-ACK response is provided and the PDCCH/EPDCCH for instructing downlink SPS release is detected, the bit of the HARQ-ACK for the serving cell is set to NACK.

In a case that two PUCCH cell groups are configured to the terminal device 1, PUCCH format 1b with channel selection is configured to each of the two PUCCH cell groups, and transmission of a scheduling request takes place in a subframe in which transmission of PUCCH format 1b with channel selection is performed, and that the scheduling request is the positive scheduling request, the terminal device 1 may transmit the 1-bit HARQ-ACK per PUCCH cell group by using the PUCCH resource for the scheduling request. In other words, in a case that, for example, information bits of two bits (b(0) and b(1)) are transmitted by using the PUCCH resource for the scheduling request, each of the information bits of the two bits (b(0) and b(1)) is associated with one PUCCH cell group.

In a case that, in a scheduling request transmission instance which is instructed by the MAC layer to signal a scheduling request by using the PUCCH, and does not include the PUSCH, transmission of a HARQ-ACK takes place by using PUCCH format 3 in the PUCCH serving cell to which the PUCCH resource for the scheduling request is configured, both of the HARQ-ACK and the scheduling request may be transmitted by using the PUCCH resource for the HARQ-ACK and PUCCH format 3 in the PUCCH serving cell to which the PUCCH resource for the scheduling request is configured. The scheduling request is multiplexed with the HARQ-ACK transmitted by using PUCCH format 3 in the scheduling request transmission instance.

In a case that, in a scheduling request transmission instance which is instructed by the MAC layer to signal a scheduling request by using the PUCCH, and does not include the PUSCH, transmission of a HARQ-ACK takes place by using PUCCH format 3 in a PUCCH serving cell other than the PUCCH serving cell to which the PUCCH resource for the scheduling request is configured, both of the HARQ-ACK and the scheduling request may be transmitted by using the PUCCH resource for the HARQ-ACK and PUCCH format 3 in the PUCCH serving cell other than the PUCCH serving cell to which the PUCCH resource for the scheduling request is configured.

Figure 5:
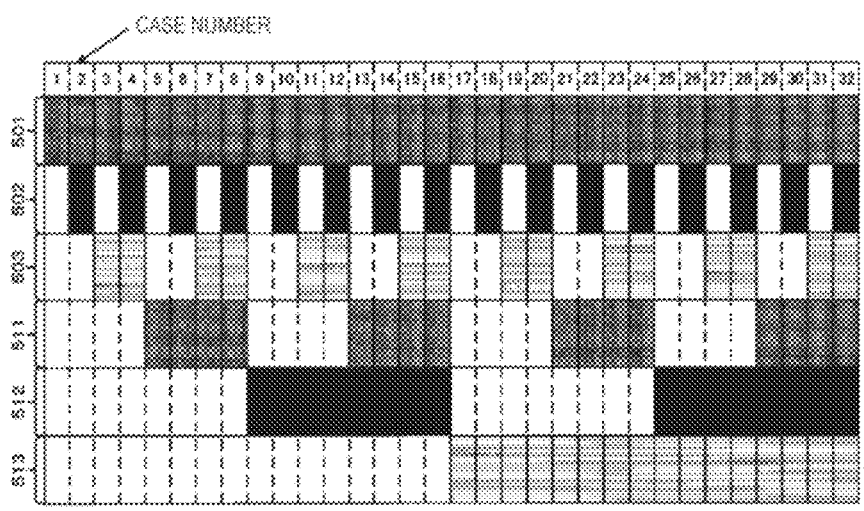
FIG. 5 is a diagram illustrating multiple cases that transmission of a scheduling request and transmission of uplink control information coincide in time in a subframe according to the present embodiment.

FIG. 5 is a diagram illustrating multiple cases that transmission of a scheduling request and transmission of uplink control information coincide in time in a subframe according to the present embodiment. FIG. 5 illustrates Case 1 to Case 32. Respective cases of Case 1 to Case 32 may be associated with different subframes or may be associated with the same subframe. The MAC layer instructs the physical layer to signal a scheduling request by using a PUCCH in each of Case 1 to Case 32.

In Case 1 to Case 32, a higher layer parameter (simultaneousPUCCH-PUSCH) is not configured to the terminal device 1. The higher layer parameter simultaneousPUCCH-PUSCH) indicates whether simultaneous transmission of the PUCCH and the PUSCH is configured. The higher layer parameter (simultaneousPUCCH-PUSCH) is defined/configured per PUCCH serving cell. The base station device 3 configures the higher layer parameter (simultaneousPUCCH-PUSCH) field to the PUCCH serving cell. The terminal device 1 does not simultaneously transmits a PUCCH of a PUCCH serving cell to which simultaneous transmission of the PUCCH and the PUSCH (simultaneousPUCCH-PUSCH) is not configured, and the PUSCH of the serving cell in a certain subframe.

The terminal device 1 may simultaneously transmit the PUCCH of the PUCCH serving cell to which simultaneous transmission of the PUCCH and the PUSCH (simultaneousPUCCH-PUSCH) is configured, and the PUSCH of the serving cell in a certain subframe.

In each of Case 1 to Case 32 in FIG. 5, transmission of the PUSCH including a transport block does not take place. In FIG. 5, one of the first serving cell and the second serving cell is a primary cell, and the other of the first serving cell and the second serving cell is a secondary cell. The secondary cell is not a primary secondary cell.

Reference numeral 501 in FIG. 5 denotes a first PUCCH resource (first PUCCH format 1 resource) for a scheduling request configured to the first serving cell. In each of Case 1 to Case 32, the first PUCCH resource for the scheduling request is configured to the first serving cell.

Reference numeral 502 in FIG. 5 denotes transmission of the first PUSCH not including a transport block (UL-SCH) in the first serving cell. In each of the even-numbered cases, the transmission of the first PUSCH not including a transport block takes place in the first serving cell. The transmission of the PUSCH not including the transport block (UL-SCH) is transmission of a PUSCH which includes only HARQ-ACK and/or channel state information.

Reference numeral 503 in FIG. 5 denotes transmission of a first HARQ-ACK which uses a prescribed PUCCH format in the first serving cell. In each of cases in which remainders obtained by dividing the case numbers by 4 are {0, 3}, the transmission of the first HARQ-ACK which uses the prescribed PUCCH format takes place in the first serving cell. The prescribed PUCCH format may include PUCCH format 3, and/or a PUCCH format other than PUCCH format 3.

In the cases that the transmission of the first HARQ-ACK which uses the prescribed PUCCH format does not take place in the first serving cell, the transmission of the first HARQ-ACK which uses the PUCCH format other than the prescribed PUCCH format may take place in the first serving cell. The "cases that the transmission of the first HARQ-ACK which uses the prescribed PUCCH format does not take place in the first serving cell" correspond to the "cases in which remainders obtained by dividing the case numbers by 4 are {1, 2}". The "transmission of the HARQ-ACK which uses the PUCCH format other than the prescribed PUCCH format" includes "transmission of a HARQ-ACK which uses PUCCH format 1a, PUCCH format 1b or PUCCH format 1b with channel selection".

Reference numeral 511 in FIG. 5 denotes a second PUCCH resource (second PUCCH format 1 resource) for a scheduling request configured to the second serving cell. In each of the cases in which remainders obtained by dividing the case numbers by 8 are {0, 5, 6, 7}, the second PUCCH resource for the scheduling request is configured to the second serving cell. In each of the cases in which remainders obtained by dividing the case numbers by 8 are {0, 5, 6, 7}, the physical layer and/or the MAC layer selects one of the first PUCCH resource configured in the first serving cell, and the second PUCCH resource configured in the second serving cell.

The terminal device 1 may select one of the first PUCCH resource and the second PUCCH resource based on a value of estimated transmit power for uplink transmission. The terminal device 1 may select one of the first PUCCH resource and the second PUCCH resource based on whether the value of the estimated transmit power for the uplink transmission reaches a value of maximum transmit power.

The terminal device 1 may select one of the first PUCCH resource and the second PUCCH resource based on whether the first PUCCH resource or the second PUCCH resource is included in a serving cell in which transmission of the PUSCH not including a transport block is performed in a certain subframe.

The terminal device 1 may select one of the first PUCCH resource and the second PUCCH resource based on whether the first PUCCH resource or the second PUCCH resource is included in the serving cell in which transmission of a HARQ-ACK by using a prescribed PUCCH format is performed in a certain subframe.

The terminal device 1 may select one of the first PUCCH resource and the second PUCCH resource based on (i) whether the value of the estimated transmit power for the uplink transmission reaches the value of the maximum transmit power, (ii) whether the first PUCCH resource or the second PUCCH resource is included in the serving cell in which the transmission of the PUSCH not including the transport block is performed, and/or (iii) whether the first PUCCH resource or the second PUCCH resource is included in the serving cell in which the transmission of the HARQ-ACK by using the prescribed PUCCH format is performed in a certain subframe.

Reference numeral 512 in FIG. 5 denotes transmission of the second PUSCH not including the transport block (UL-SCH) in the second serving cell. In each of the Case 9 to Case 16 and Case 25 to Case 32, the transmission of the second PUSCH not including a transport block takes place in the second serving cell.

Reference numeral 513 in FIG. 5 denotes transmission of a second HARQ-ACK which uses a prescribed PUCCH format in the second serving cell. In each of Case 17 to Case 32, the transmission of the second HARQ-ACK which uses the prescribed PUCCH format takes place in the second serving cell.

In cases that the transmission of the second HARQ-ACK which uses the prescribed PUCCH format does not take place in the second serving cell, transmission of a HARQ-ACK which uses a PUCCH format other than the prescribed PUCCH format may take place in the second serving cell. The "cases that the transmission of the second HARQ-ACK which uses the prescribed PUCCH format does not take place in the second serving cell" correspond to "Case 1 to Case 16". "The transmission of the HARQ-ACK which uses the PUCCH format other than the prescribed PUCCH format" includes "transmission of a HARQ-ACK which uses PUCCH format 1a, PUCCH format 1b or PUCCH format 1b with channel selection".

For example, in Case 11 in FIG. 5, (i) the first PUCCH resource for a scheduling request is configured to the first serving cell, (ii) transmission of the first PUSCH not including a transport block does not take place in the first serving cell, (iii) transmission of the first HARQ-ACK which uses a prescribed PUCCH format takes place in the first serving cell, (iv) the second PUCCH resource for a scheduling request is not configured to the second serving cell, (v) transmission of the second PUSCH not including a transport block takes place in the second serving cell, and (vi) transmission of the second HARQ-ACK which uses a prescribed PUCCH format does not take place in the second serving cell.

Hereinafter, how the terminal device 1 transmit a scheduling request, a HARQ-ACK and/or channel state information in each of Case 1 to Case 32 in FIG. 5 will be described.

Case 1

In a subframe associated with Case 1, the terminal device 1 transmits a scheduling request by using the first PUCCH resource and PUCCH format 1.

Case 2

In a subframe associated with Case 2, the terminal device 1 transmits a scheduling request by using the first PUCCH resource configured to the first serving cell, and PUCCH format 1, and does not transmit the first PUSCH not including a transport block in the first serving cell.

Case 3

In a subframe associated with Case 3, the terminal device 1 does not transmit a scheduling request by using the first PUCCH resource configured to the first serving cell, and PUCCH format 1, and transmits the first HARQ-ACK and the scheduling request by using a prescribed PUCCH format in the first serving cell. The scheduling request is multiplexed with the first HARQ-ACK transmitted by using the prescribed PUCCH format in the first serving cell. The value of the scheduling request multiplexed with the first HARQ-ACK is associated with the positive scheduling request.

Case 4

In a subframe associated with Case 4, the terminal device 1 does not transmit a scheduling request by using the first PUCCH resource configured to the first serving cell, and PUCCH format 1, does not transmit the first PUSCH not including the transport block in the first serving cell, and transmits a first HARQ-ACK and the scheduling request by using the prescribed PUCCH format in the first serving cell. The value of the scheduling request multiplexed with the first HARQ-ACK is associated with the positive scheduling request.

Case 5

The terminal device 1 selects one of the first PUCCH resource configured to the first serving cell, and the second PUCCH resource configured to the second serving cell. In a subframe associated with Case 5, the terminal device 1 transmits a scheduling request by using the selected PUCCH resource and PUCCH format 1.

Case 6

In a case that the terminal device 1 selects one of the PUCCH resource configured to the first serving cell and the PUCCH resource configured to the second serving cell, the second PUCCH resource configured to the second serving cell in which transmission of the second PUSCH not including a transport block is not performed may have a higher priority, and the terminal device 1 may select the second PUCCH resource.

Case 6

In a case that the terminal device 1 selects the first PUCCH resource configured to the first serving cell from the first PUCCH resource configured to the first serving cell and the second PUCCH resource configured to the second serving cell, the terminal device 1, in a subframe associated with Case 6, transmits a scheduling request by using the first PUCCH resource configured to the first serving cell, and PUCCH format 1, does not transmit the first PUSCH not including the transport block in the first serving cell, and does not transmit the scheduling request by using the second PUCCH resource configured to the second serving cell, and PUCCH format 1.

Case 6

In a case that the terminal device 1 selects the second PUCCH resource configured to the second serving cell from the first PUCCH resource configured to the first serving cell and the second PUCCH resource configured to the second serving cell, the terminal device 1, in the subframe associated with Case 6, does not transmit the scheduling request by using the first PUCCH resource configured to the first serving cell, and PUCCH format 1, transmits the first PUCCH not including the transport block in the first serving cell, and transmits the scheduling request by using the second PUCCH resource configured to the second serving cell, and PUCCH format 1.

Case 7

In a case that the terminal device 1 selects one of the first PUCCH resource configured to the first serving cell and the second PUCCH resource configured to the second serving cell, the second PUCCH resource configured to the second serving cell in which transmission of a second HARQ-ACK by using a prescribed PUCCH format is not performed may have a lower priority, and the terminal device 1 may select the first PUCCH resource.

Case 7

In the case that the terminal device 1 selects the first PUCCH resource configured to the first serving cell from the first PUCCH resource configured to the first serving cell and the second PUCCH resource configured to the second serving cell, the terminal device 1, in a subframe associated with Case 7, does not transmit the scheduling request by using the first PUCCH resource configured to the first serving cell, and PUCCH format 1, transmits the first HARQ-ACK and the scheduling request by using the prescribed PUCCH format in the first serving cell, and does not transmit the scheduling request by using the second PUCCH resource configured to the second serving cell and the PUCCH format 1. The value of the scheduling request multiplexed with the first HARQ-ACK is associated with the positive scheduling request.

Case 7

In the case that the terminal device 1 selects the second PUCCH resource configured to the second serving cell from the first PUCCH resource configured to the first serving cell and the second PUCCH resource configured to the second serving cell, the terminal device 1, in the subframe associated with Case 7, does not transmit the scheduling request by using the first PUCCH resource configured to the first serving cell, and PUCCH format 1, transmits the first HARQ-ACK and the scheduling request by using the prescribed PUCCH format in the first serving cell, and transmits the scheduling request by using the second PUCCH resource configured to the second serving cell, and PUCCH format 1. The scheduling request is not multiplexed with the first HARQ-ACK transmitted by using the prescribed PUCCH format in the first serving cell. The value of the scheduling request multiplexed with the first HARQ-ACK is associated with the negative scheduling request. The value of the scheduling request multiplexed with the first HARQ-ACK may be associated with the positive scheduling request.

Case 7

In the subframe associated with Case 7, irrespective of which one of the first PUCCH resource configured to the first serving cell and the second PUCCH resource configured to the second serving cell is selected, the terminal device 1 may not transmit the scheduling request by using the first PUCCH resource in the first serving cell and PUCCH format 1, may transmit the first HARQ-ACK and the scheduling request by using the prescribed PUCCH format in the first serving cell, and may not transmit the scheduling request by using the second PUCCH resource in the second serving cell and PUCCH format 1. The value of the scheduling request multiplexed with the first HARQ-ACK is associated with the positive scheduling request.

Case 8

In the case that the terminal device 1 selects one of the first PUCCH resource configured to the first serving cell and the second PUCCH resource configured to the second serving cell, the first PUCCH resource configured to the first serving cell in which transmission of the first PUSCH not including a transport block is performed, and transmission of the first HARQ-ACK is performed by using the prescribed PUCCH format may have a lower priority, and the terminal device 1 may select the second PUCCH resource.

Case 8

In the case that the terminal device 1 selects one of the first PUCCH resource configured to the first serving cell and the second PUCCH resource configured to the second serving cell, the terminal device 1 may select the first PUCCH resource based on that the value of the estimated transmit power for the uplink transmission reaches the value of the maximum transmit power.

Case 8

In the case that the terminal device 1 selects one of the first PUCCH resource configured to the first serving cell and the second PUCCH resource configured to the second serving cell, the terminal device 1 may select the second PUCCH resource based on that the value of the estimated transmit power for the uplink transmission does not reach the value of the maximum transmit power.

Case 8

In the case that the terminal device 1 selects the first PUCCH resource configured to the first serving cell from the first PUCCH resource configured to the first serving cell and the second PUCCH resource configured to the second serving cell, the terminal device 1, in a subframe associated with Case 8, does not transmit the scheduling request by using the first PUCCH resource configured to the first serving cell, and PUCCH format 1, does not transmit the first PUSCH not including the transport block in the first serving cell, transmits the first HARQ-ACK and the scheduling request by using the prescribed PUCCH format in the first serving cell, and does not transmit the scheduling request by using the second PUCCH resource configured to the second serving cell, and PUCCH format 1. The value of the scheduling request multiplexed with the first HARQ-ACK is associated with the positive scheduling request.

Case 8

In the case that the terminal device 1 selects the second PUCCH resource configured to the second serving cell from the first PUCCH resource configured to the first serving cell and the second PUCCH resource configured to the second serving cell, the terminal device 1, in the subframe associated with Case 8, does not transmit the scheduling request by using the first PUCCH resource configured to the first serving cell, and PUCCH format 1, transmits the first PUSCH not including the transport block in the first serving cell, does not transmit the scheduling request and the HARQ-ACK by using the prescribed PUCCH format in the first serving cell, and transmits the scheduling request by using the second PUCCH resource configured to the second serving cell, and PUCCH format 1. The first HARQ-ACK is included in the first PUSCH.

Case 8

In the subframe associated with Case 8, irrespective of which one of the first PUCCH resource configured to the first serving cell and the second PUCCH resource configured to the second serving cell is selected, the terminal device 1 may not transmit the scheduling request by using the selected PUCCH resource and PUCCH format 1, may not transmit the first PUSCH not including the transport block in the first serving cell, and may transmit the first HARQ-ACK and the scheduling request by using the prescribed PUCCH format in the first serving cell. The value of the scheduling request multiplexed with the first HARQ-ACK is associated with the positive scheduling request.

Case 9

In a subframe associated with Case 9, the terminal device 1 transmits the scheduling request by using the first PUCCH resource configured to the first serving cell, and PUCCH format 1, and transmits the second PUSCH not including the transport block in the second serving cell.

Case 10

In a subframe associated with Case 10, the terminal device 1 transmits the scheduling request by using the first PUCCH resource configured to the first serving cell, and PUCCH format 1, does not transmit the first PUSCH not including the transport block in the first serving cell, and transmits the second PUSCH not including the transport block in the second serving cell.

Case 11

In a subframe associated with Case 11, the terminal device 1 does not transmit the scheduling request by using the first PUCCH resource configured to the first serving cell, and PUCCH format 1, transmits the first HARQ-ACK and the scheduling request by using the prescribed PUCCH format in the first serving cell, and transmits the second PUSCH not including the transport block in the second serving cell. The value of the scheduling request multiplexed with the first HARQ-ACK is associated with a positive scheduling request.

Case 12

In a subframe associated with Case 12, the terminal device 1 does not transmit the scheduling request by using the first PUCCH resource configured to the first serving cell, and PUCCH format 1, does not transmit the first PUSCH not including the transport block in the first serving cell, transmits the first HARQ-ACK and the scheduling request by using the prescribed PUCCH format in the first serving cell, and transmits the second PUSCH not including the transport block in the second serving cell. The value of the scheduling request multiplexed with the first HARQ-ACK is associated with the positive scheduling request.

Case 13

Description of Case 13 is omitted. By replacing the first serving cell in Case 6 and the second serving cell in Case 6 with each other, Case 6 thus replaced is the same as Case 13.

Case 14

The terminal device 1 selects one of the first PUCCH resource configured to the first serving cell and the second PUCCH resource configured to the second serving cell.

Case 14

In the case that the terminal device 1 selects the first PUCCH resource configured to the first serving cell from the first PUCCH resource configured to the first serving cell and the second PUCCH resource configured to the second serving cell, the terminal device 1, in a subframe associated with Case 14, transmits the scheduling request by using the first PUCCH resource configured to the first serving cell, and PUCCH format 1, does not transmit the first PUSCH not including the transport block in the first serving cell, does not transmit the scheduling request by using the second PUCCH resource configured to the second serving cell, and PUCCH format 1, and transmits the second PUSCH not including the transport block in the second serving cell.

Case 14

In the case that the terminal device 1 selects the second PUCCH resource configured to the second serving cell from the first PUCCH resource configured to the first serving cell and the second PUCCH resource configured to the second serving cell, the terminal device 1, in a subframe associated with case 14, does not transmit a scheduling request by using the first PUCCH resource configured to the first serving cell, and PUCCH format 1, transmits the first PUSCH not including the transport block in the first serving cell, transmits the scheduling request by using the second PUCCH resource configured to the second serving cell, and PUCCH format 1, and does not transmit the second PUSCH not including the transport block in the second serving cell.

Case 15

In the case that the terminal device 1 selects one of the first PUCCH resource configured to the first serving cell and the second PUCCH resource configured to the second serving cell, the second PUCCH resource configured to the second serving cell in which transmission of the second PUSCH not including the transport block is performed may have a lower priority than the first PUCCH resource configured to the first serving cell in which transmission of the first HARQ-ACK is performed by using the prescribed PUCCH format, and the terminal device 1 may select the first PUCCH resource.

Case 15

In the case that the terminal device 1 selects the first PUCCH resource configured to the first serving cell from the first PUCCH resource configured to the first serving cell and the second PUCCH resource configured to the second serving cell, the terminal device 1, in a subframe associated with Case 15, does not transmit a scheduling request by using the first PUCCH resource configured to the first serving cell, and PUCCH format 1, transmits the first HARQ-ACK and the scheduling request by using the prescribed PUCCH format in the first serving cell, does not transmit the scheduling request by using the second PUCCH resource configured to the second serving cell, and PUCCH format 1, and transmits the second PUSCH not including the transport block in the second serving cell. The value of the scheduling request multiplexed with the first HARQ-ACK is associated with the positive scheduling request.

Case 15

In the case that the terminal device 1 selects the second PUCCH resource configured to the second serving cell from the first PUCCH resource configured to the first serving cell and the second PUCCH resource configured to the second serving cell, the terminal device 1, in a subframe associated with Case 15, does not transmit a scheduling request by using the first PUCCH resource configured to the first serving cell, and PUCCH format 1, transmits the first HARQ-ACK and the scheduling request by using the prescribed PUCCH format in the first serving cell, transmits the scheduling request by using the second PUCCH resource configured to the second serving cell, and PUCCH format 1, and does not transmit the second PUSCH not including the transport block in the second serving cell. The value of the scheduling request multiplexed with the first HARQ-ACK is associated with the negative scheduling request. The value of the scheduling request multiplexed with the first HARQ-ACK may be associated with the positive scheduling request.

Case 15

In the subframe associated with Case 15, irrespective of which one of the first PUCCH resource configured to the first serving cell and the second PUCCH resource configured to the second serving cell is selected, the terminal device 1 may not transmit the scheduling request by using the first PUCCH resource configured to the first serving cell, and PUCCH format 1, may not transmit the first HARQ-ACK and the scheduling request by using the prescribed PUCCH format in the first serving cell, may not transmit the scheduling request by using the second PUCCH resource configured to the second serving cell, and PUCCH format 1, and may transmit the second PUSCH not including the transport block in the second serving cell. The value of the scheduling request multiplexed with the first HARQ-ACK is associated with the positive scheduling request.

Case 16

The terminal device 1 selects one of the first PUCCH resource configured to the first serving cell and the second PUCCH resource configured to the second serving cell.

Case 16

In the case that the terminal device 1 selects the first PUCCH resource configured to the first serving cell from the first PUCCH resource configured to the first serving cell and the second PUCCH resource configured to the second serving cell, the terminal device 1, in a subframe associated with Case 16, does not transmit a scheduling request by using the first PUCCH resource configured to the first serving cell, and PUCCH format 1, does not transmit the first PUSCH not including the transport block in the first serving cell, transmits the first HARQ-ACK and the scheduling request by using the prescribed PUCCH format in the first serving cell, does not transmit the scheduling request by using the second PUCCH resource configured to the second serving cell, and PUCCH format 1, and transmits the second PUSCH not including the transport block in the second serving cell. The value of the scheduling request multiplexed with the first HARQ-ACK is associated with the positive scheduling request.

Case 16

In the case that the terminal device 1 selects the second PUCCH resource configured to the second serving cell from the first PUCCH resource configured to the first serving cell and the second PUCCH resource configured to the second serving cell, the terminal device 1 does not transmit a scheduling request by using the first PUCCH resource configured to the first serving cell, and PUCCH format 1 in the subframe associated with Case 16, transmits the first PUSCH not including the transport block in the first serving cell, does not transmit the first HARQ-ACK and the scheduling request by using the prescribed PUCCH format in the first serving cell, transmits the scheduling request by using the second PUCCH resource configured to the second serving cell, and PUCCH format 1, and does not transmit the second PUSCH not including the transport block in the second serving cell. The first HARQ-ACK is included in the first PUSCH.

Case 17

In a subframe associated with Case 1, the terminal device 1 transmits the scheduling request by using the PUCCH resource configured to the first serving cell, and PUCCH format 1, and transmits the second HARQ-ACK without the scheduling request by using the prescribed PUCCH format in the second serving cell.

Case 17

In the subframe associated with Case 17, the terminal device 1 may not transmit the scheduling request by using the PUCCH resource configured to the first serving cell, and PUCCH format 1, and may transmit the second HARQ-ACK and the scheduling request by using the prescribed PUCCH format in the second serving cell. The value of the scheduling request multiplexed with the second HARQ-ACK is associated with the positive scheduling request.

Case 18

In a subframe associated with Case 18, the terminal device 1 transmits the scheduling request by using the PUCCH resource configured to the first serving cell, and PUCCH format 1, does not transmit the first PUSCH not including the transport block in the first serving cell, and transmits the second HARQ-ACK without the scheduling request by using the prescribed PUCCH format in the second serving cell.

Case 18

In the subframe associated with Case 18, the terminal device 1 may not transmit the scheduling request by using the PUCCH resource configured to the first serving cell, and PUCCH format 1, may transmit the first PUSCH not including the transport block in the first serving cell, and may transmit the second HARQ-ACK and the scheduling request by using the prescribed PUCCH format in the second serving cell. The value of the scheduling request multiplexed with the second HARQ-ACK is associated with the positive scheduling request.

Case 19

In a subframe associated with Case 19, the terminal device 1 does not transmit a scheduling request by using the first PUCCH resource configured to the first serving cell, and PUCCH format 1, transmits the first HARQ-ACK and the scheduling request by using the prescribed PUCCH format in the first serving cell, and transmits the second HARQ-ACK without the scheduling request by using the prescribed PUCCH format in the second serving cell. The value of the scheduling request multiplexed with the first HARQ-ACK is associated with the positive scheduling request.

Case 19

In the subframe associated with Case 19, the terminal device 1 may transmit the second HARQ-ACK and the scheduling request by using the prescribed PUCCH format in the second serving cell. The value of the scheduling request multiplexed with the second HARQ-ACK may be associated with the positive scheduling request. Consequently, it is possible to transmit the positive scheduling request robustly.

Case 20

In a subframe associated with Case 20, the terminal device 1 does not transmit a scheduling request by using the first PUCCH resource configured to the first serving cell, and PUCCH format 1, does not transmit the first PUSCH not including the transport block in the first serving cell, transmits the first HARQ-ACK and the scheduling request by using the prescribed PUCCH format in the first serving cell, and transmits the second HARQ-ACK without the scheduling request by using the prescribed. PUCCH format in the second serving cell. The value of the scheduling request multiplexed with the first HARQ-ACK is associated with the positive scheduling request.

Case 20

In the subframe associated with Case 20, the terminal device 1 may transmit the second HARQ-ACK and the scheduling request by using the prescribed PUCCH format in the second serving cell. The value of the scheduling request multiplexed with the second HARQ-ACK may be associated with the positive scheduling request. Consequently, it is possible to transmit the positive scheduling request robustly.

Case 20

In the subframe associated with Case 20, the terminal device 1 may not transmit the scheduling request by using the first PUCCH resource configured to the first serving cell, and PUCCH format 1, may transmit the first PUSCH not including the transport block in the first serving cell, may not transmit the first HARQ-ACK and the scheduling request by using the prescribed PUCCH format in the first serving cell, and may transmit the second HARQ-ACK and the scheduling request by using the prescribed PUCCH format in the second serving cell. The first HARQ-ACK is included in the first PUCCH.

Case 21

Description of Case 21 is omitted. By replacing the first serving cell in Case 7 and the second serving cell in Case 7 with each other, Case 7 thus replaced is the same as Case 21.

Case 22

Description of case 22 is omitted. By replacing the first serving cell in case 15 and the second serving cell in case 15 with each other, case 15 thus replaced is the same as case 22.

Case 23

The terminal device 1 selects one of the first PUCCH resource configured to the first serving cell and the second PUCCH resource configured to the second serving cell.

Case 23

In the case that the terminal device 1 selects the first PUCCH resource configured to the first serving cell from the first PUCCH resource configured to the first serving cell and the second PUCCH resource configured to the second serving cell, the terminal device 1, in a subframe associated with Case 23, does not transmit a scheduling request by using the first PUCCH resource configured to the first serving cell, and PUCCH format 1, transmits the first HARQ-ACK and the scheduling request by using the prescribed PUCCH format in the first serving cell, does not transmit the scheduling request by using the second PUCCH resource configured to the second serving cell, and PUCCH format 1, and transmits the second HARQ-ACK and the scheduling request by using the prescribed PUCCH format in the second serving cell. The value of the scheduling request multiplexed with the first HARQ-ACK is associated with the positive scheduling request. The value of the scheduling request multiplexed with the second HARQ-ACK is associated with the negative scheduling request. The value of the scheduling request multiplexed with the second HARQ-ACK may be associated with the positive scheduling request.

Case 23

In the case that the terminal device 1 selects the second PUCCH resource configured to the second serving cell from the first PUCCH resource configured to the first serving cell and the second PUCCH resource configured to the second serving cell, the terminal device 1, in a subframe associated with Case 23, does not transmit a scheduling request by using the first PUCCH resource configured to the first serving cell, and PUCCH format 1, transmits the first HARQ-ACK and the scheduling request by using the prescribed PUCCH format in the first serving cell, does not transmit the scheduling request by using the second PUCCH resource configured to the second serving cell, and PUCCH format 1, and transmits the second HARQ-ACK and the scheduling request by using the prescribed PUCCH format in the second serving cell. The value of the scheduling request multiplexed with the first HARQ-ACK is associated with the negative scheduling request. The value of the scheduling request multiplexed with the second HARQ-ACK is associated with the positive scheduling request. The value of the scheduling request multiplexed with the first HARQ-ACK may be associated with the positive scheduling request.

Case 23

In a subframe associated with Case 23, irrespective of which one of the first PUCCH resource configured to the first serving cell and the second PUCCH resource configured to the second serving cell is selected, the terminal device 1 may not transmit the scheduling request by using the first PUCCH resource in the first serving cell and PUCCH format 1, may transmit the first HARQ-ACK and the positive scheduling request by using the prescribed PUCCH format in the first serving cell, may not transmit the scheduling request by using the second PUCCH resource in the second serving cell and PUCCH format 1, and may transmit the second HARQ-ACK and the positive scheduling request by using the prescribed PUCCH format in the second serving cell.

Case 24

In the case that the terminal device 1 selects one of the first PUCCH resource configured to the first serving cell and the second PUCCH resource configured to the second serving cell, the first PUCCH resource configured to the first serving cell in which transmission of the first PUSCH not including the transport block is performed and transmission of the first HARQ-ACK by using the prescribed PUCCH format is performed may have a lower priority than the second PUCCH resource configured to the second serving cell in which transmission of the second PUSCH not including the transport block is not performed and transmission of the second HARQ-ACK by using the prescribed PUCCH format is performed, and the terminal device 1 may select the second PUCCH resource.

Case 24

In the case that the terminal device 1 selects the first PUCCH resource configured to the first serving cell from the first PUCCH resource configured to the first serving cell and the second PUCCH resource configured to the second serving cell, the terminal device 1, in a subframe associated with Case 24, does not transmit a scheduling request by using the first PUCCH resource configured to the first serving cell, and PUCCH format 1, does not transmit the first PUSCH not including the transport block in the first serving cell, transmits the first HARQ-ACK and the scheduling request by using the prescribed PUCCH format in the first serving cell, does not transmit the scheduling request by using the second PUCCH resource configured to the second serving cell, and PUCCH format 1, and transmits the second HARQ-ACK and the scheduling request by using the prescribed PUCCH format in the second serving cell. The value of the scheduling request multiplexed with the first HARQ-ACK is associated with the positive scheduling request. The value of the scheduling request multiplexed with the second HARQ-ACK is associated with the negative scheduling request. The value of the scheduling request multiplexed with the second HARQ-ACK may be associated with the positive scheduling request.

Case 24

In the case that the terminal device 1 selects the second PUCCH resource configured to the second serving cell from the first PUCCH resource configured to the first serving cell and the second PUCCH resource configured to the second serving cell, the terminal device 1, in a subframe associated with Case 24, does not transmit a scheduling request by using the first PUCCH resource configured to the first serving cell, and PUCCH format 1, transmits the first PUSCH not including the transport block in the first serving cell, does not transmit the first HARQ-ACK and the scheduling request by using the prescribed PUCCH format in the first serving cell, does not transmit the scheduling request by using the second PUCCH resource configured to the second serving cell, and PUCCH format 1, and transmits the second HARQ-ACK and the scheduling request by using the prescribed PUCCH format in the second serving cell. The first HARQ-ACK is included in the first PUSCH. The value of the scheduling request multiplexed with the second HARQ-ACK is associated with the positive scheduling request.

Case 24

In the subframe associated with Case 24, irrespective of which one of the first PUCCH resource configured to the first serving cell and the second PUCCH resource configured to the second serving cell is selected, the terminal device 1 may not transmit the scheduling request by using the first PUCCH resource configured to the first serving cell, and PUCCH format 1, may transmit the first PUSCH not including the transport block in the first serving cell, may not transmit the first HARQ-ACK and the scheduling request by using the prescribed PUCCH format in the first serving cell, may not transmit the scheduling request by using the second PUCCH resource configured to the second serving cell, and PUCCH format 1, and may transmit the second HARQ-ACK and the scheduling request by using the prescribed PUCCH format in the second serving cell. The first HARQ-ACK is included in the first PUSCH. The value of the scheduling request multiplexed with the second HARQ-ACK is associated with the positive scheduling request.

Case 25

In a subframe associated with Case 25, the terminal device 1 transmits a scheduling request by using the first PUCCH resource configured to the first serving cell, and PUCCH format 1, transmits the second PUSCH not including the transport block in the second serving cell, and does not transmit the second HARQ-ACK and the scheduling request by using the prescribed PUCCH format in the second serving cell. The second HARQ-ACK is included in the second PUSCH.

Case 25

In the subframe associated with Case 25, the terminal device 1 may not transmit the scheduling request by using the first PUCCH resource configured to the first serving cell, and PUCCH format 1, may not transmit the second PUSCH not including the transport block in the second serving cell, and may transmit the second HARQ-ACK and the scheduling request by using the prescribed PUCCH format in the second serving cell. The value of the scheduling request multiplexed with the second HARQ-ACK is associated with the positive scheduling request.

Case 26

In a subframe associated with case 26, the terminal device 1 transmits a scheduling request by using the first PUCCH resource configured to the first serving cell, and PUCCH format 1, does not transmit the first PUSCH not including the transport block in the first serving cell, transmits the second PUSCH not including the transport block in the second serving cell, and does not transmit the second HARQ-ACK and the scheduling request by using the prescribed PUCCH format in the second serving cell. The second HARQ-ACK is included in the second PUSCH.

Case 26

In the subframe associated with Case 26, the terminal device 1 may not transmit the scheduling request by using the first PUCCH resource configured to the first serving cell, and PUCCH format 1, may transmit the first PUSCH not including the transport block in the first serving cell, may not transmit the second PUSCH not including the transport block in the second serving cell, and may transmit the second HARQ-ACK and the scheduling request by using the prescribed PUCCH format in the second serving cell. The value of the scheduling request multiplexed with the second HARQ-ACK is associated with the positive scheduling request.

Case 27

In a subframe associated with Case 27, the terminal device 1 does not transmit a scheduling request by using the first PUCCH resource configured to the first serving cell, and PUCCH format 1, transmits the first HARQ-ACK and the scheduling request by using the prescribed PUCCH format in the first serving cell, transmits the second PUSCH not including the transport block in the second serving cell, and does not transmit the second HARQ-ACK and the scheduling request by using the prescribed PUCCH format in the second serving cell. The value of the scheduling request multiplexed with the first HARQ-ACK is associated with the positive scheduling request. The second HARQ-ACK is included in the second PUSCH.

Case 28

In a subframe associated with Case 28, the terminal device 1 does not transmit a scheduling request by using the first PUCCH resource configured to the first serving cell, and PUCCH format 1, does not transmit the first PUSCH not including the transport block in the first serving cell, transmits the first HARQ-ACK and the scheduling request by using the prescribed PUCCH format in the first serving cell, transmits the second PUSCH not including the transport block in the second serving cell, and does not transmit the second HARQ-ACK and the scheduling request by using the prescribed PUCCH format in the second serving cell. The value of the scheduling request multiplexed with the first HARQ-ACK is associated with the positive scheduling request. The second HARQ-ACK is included in the second PUSCH.

Case 28

In the subframe associated with Case 28, the terminal device 1 may not transmit the scheduling request by using the first PUCCH resource configured to the first serving cell, and PUCCH format 1, may transmit the first PUSCH not including the transport block in the first serving cell, may not transmit the first HARQ-ACK and the scheduling request by using the prescribed PUCCH format in the first serving cell, may not transmit the second PUSCH not including the transport block in the second serving cell, and may transmit the second HARQ-ACK and the scheduling request by using the prescribed PUCCH format in the second serving cell. In this regard, the first HARQ-ACK is included in the first PUSCH. The value of the scheduling request multiplexed with the second HARQ-ACK is associated with the positive scheduling request.

Case 29

Description of Case 29 is omitted. By replacing the first serving cell in Case 8 and the second serving cell in Case 8 with each other, Case 8 thus replaced is the same as Case 29.

Case 30

Description of Case 30 is omitted. By replacing the first serving cell in Case 16 and the second serving cell in Case 16 with each other, case 16 thus replaced is the same as Case 30.

Case 31

Description of Case 31 is omitted. By replacing the first serving cell in Case 24 and the second serving cell in Case 24 with each other, Case 24 thus replaced is the same as Case 31.

Case 32

The terminal device 1 selects one of the first PUCCH resource configured to the first serving cell and the second PUCCH resource configured to the second serving cell.

Case 32

In the case that the terminal device 1 selects the first PUCCH resource configured to the first serving cell from the first PUCCH resource configured to the first serving cell and the second PUCCH resource configured to the second serving cell, the terminal device 1, in a subframe associated with Case 32, does not transmit a scheduling request by using the first PUCCH resource configured to the first serving cell, and PUCCH format 1, does not transmit the first PUSCH not including the transport block in the first serving cell, transmits the first HARQ-ACK and the scheduling request by using the prescribed PUCCH format in the first serving cell, does not transmit the scheduling request by using the second PUCCH resource configured to the second serving cell, and PUCCH format 1, transmits the second PUSCH not including the transport block in the second serving cell, and does not transmit the second HARQ-ACK and the scheduling request by using the prescribed PUCCH format in the second serving cell. The value of the scheduling request multiplexed with the first HARQ-ACK is associated with the positive scheduling request. The second HARQ-ACK is included in the second PUSCH.

Case 32

In the case that the terminal device 1 selects the second PUCCH resource configured to the second serving cell from the first PUCCH resource configured to the first serving cell and the second PUCCH resource configured to the second serving cell, the terminal device 1, in the subframe associated with Case 32, does not transmit a scheduling request by using the first PUCCH resource configured to the first serving cell, and PUCCH format 1, transmits the first PUSCH not including the transport block in the first serving cell, does not transmit the first HARQ-ACK and the scheduling request by using the prescribed PUCCH format in the first serving cell, does not transmit the scheduling request by using the second PUCCH resource configured to the second serving cell, and PUCCH format 1, does not transmit the second PUSCH not including the transport block in the second serving cell, and transmits the second HARQ-ACK and the scheduling request by using the prescribed PUCCH format in the second serving cell. The value of the scheduling request multiplexed with the second HARQ-ACK is associated with the positive scheduling request. In this regard, the first HARQ-ACK is included in the first PUSCH.

In a case that the higher layer parameter (simultaneousPUCCH-PUSCH) is configured to one of the first serving cell and the second serving cell, and the higher layer parameter (simultaneousPUCCH-PUSCH) is not configured to the other one of the first serving cell and the second serving cell, the terminal device 1, in each subframe associated with part of cases in which remainders obtained by dividing the case numbers by 8 are {0, 5, 6, 7} among Case 1 to Case 32 in FIG. 5, may select a PUCCH format 1 resource of one of the first serving cell and the second serving cell.

In a case that, for example, the higher layer parameter (simultaneousPUCCH-PUSCH) is configured to the first serving cell in Cases 14, 16, 30 and 32, the higher layer parameter (simultaneousPUCCH-PUSCH) is not configured to the second serving cell, and the terminal device 1 selects one of the first PUCCH resource configured to the first serving cell and the second PUCCH resource configured to the second serving cell, the second PUCCH resource may have a lower priority than the first PUCCH resource, and the terminal device 1 may select the first PUCCH resource.

In a case that, for example, the higher layer parameter (simultaneousPUCCH-PUSCH) is not configured to the first serving cell in Cases 14, 16, 30 and 32, the higher layer parameter simultaneousPUCCH-PUSCH) is configured to the second serving cell, and the terminal device 1 selects one of the first PUCCH resource configured to the first serving cell and the second PUCCH resource configured to the second serving cell, the first PUCCH resource may have a lower priority than the second PUCCH resource, and the terminal device 1 may select the second PUCCH resource.

The terminal device 1 may select one of the first PUCCH resource and the second PUCCH resource in a subframe based on (i) whether the value of the estimated transmit power for the uplink transmission reaches the value of the maximum transmit power, (ii) whether the first PUCCH resource or the second PUCCH resource is included in a serving cell for performing transmission of the PUSCH not including the transport block, (iii) whether the first PUCCH resource or the second PUCCH resource is included in a serving cell in which transmission of a HARQ-ACK by using the prescribed PUCCH format is performed, (iv) whether the higher layer parameter (simultaneousPUCCH-PUSCH) is configured to the first serving cell, and/or (v) whether the higher layer parameter (simultaneousPUCCH-PUSCH) is configured to the second serving cell.

In a case that the higher layer parameter (simultaneousPUCCH-PUSCH) is not configured to the first serving cell in the subframe associated with Case 14, the higher layer parameter (simultaneousPUCCH-PUSCH) is configured to the second serving cell, and the first PUCCH resource configured to the first serving cell is selected from the first PUCCH resource configured to the first serving cell and the second PUCCH resource configured to the second serving cell, the terminal device 1, in the subframe associated with Case 14, transmits a scheduling request by using the first PUCCH resource configured to the first serving cell, and PUCCH format 1, transmits the first PUSCH not including the transport block in the first serving cell, does not transmit the scheduling request by using the second PUCCH resource configured to the second serving cell, and PUCCH format 1, and transmits the second PUSCH not including the transport block in the second serving cell.

In a case that, for example, the higher layer parameter (simultaneousPUCCH-PUSCH) is not configured to the first serving cell in the subframe associated with Case 14, the higher layer parameter (simultaneousPUCCH-PUSCH) is configured to the second serving cell, and the second PUCCH resource configured to the second serving cell is selected from the first PUCCH resource configured to the first serving cell and the second PUCCH resource configured to the second serving cell, the terminal device 1, in the subframe associated with Case 14, does not transmit a scheduling request by using the first PUCCH resource configured to the first serving cell, and PUCCH format 1, transmits the first PUSCH not including the transport block in the first serving cell, transmits the scheduling request by using the second PUCCH resource configured to the second serving cell, and PUCCH format 1, and does not transmit the second PUSCH not including the transport block in the second serving cell.

In FIG. 5, transmission of the first PUSCH not including the transport block (UL-SCH) in the first serving cell may be replaced with transmission of the first PUSCH not including the transport block in one of the serving cells included in the PUCCH cell group to which the first serving cell belongs. In FIG. 5, transmission of the second PUSCH not including the transport block (UL-SCH) in the second serving cell may be replaced with transmission of the second PUSCH not including the transport block in one of the serving cells included in the PUCCH cell group to which the second serving cell belongs.

In FIG. 5, one of the first serving cell and the second serving cell is the primary cell, and the other one of the first serving cell and the second serving cell is the primary secondary cell.

The terminal device 1 may switch processing based on which one of the first serving cell and the second serving cell is the primary secondary cell.

Dual connectivity is a technique that the terminal device 1 simultaneously communicates with a master base station 3 (master eNB) and a secondary base station device 3 (secondary eNB). The primary cell is associated with the mater base station device 3. The primary secondary cell is associated with the secondary base station device 3. The primary secondary cell is a cell which supports transmission of PUCCHs and the contention based random access procedure.

A configuration of devices according to the present embodiment will be described below.

Figure 6:
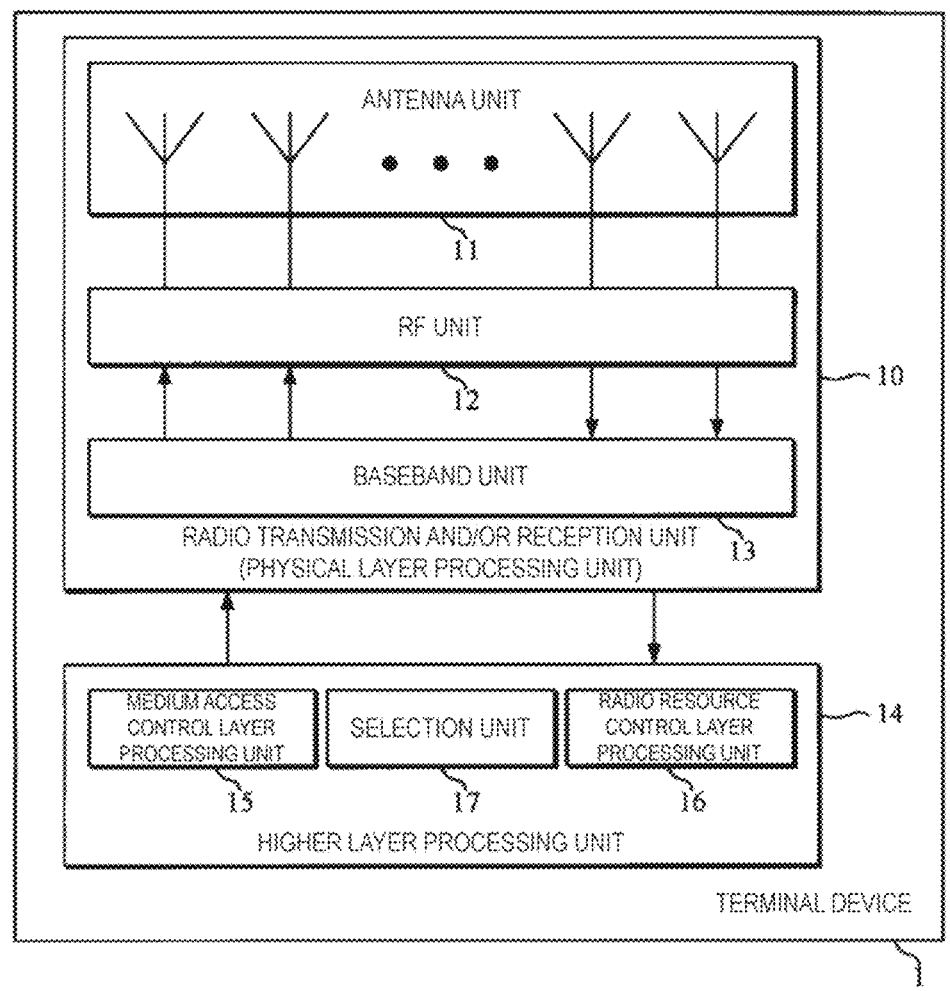
FIG. 6 is a schematic block diagram illustrating a configuration of a terminal device 1 according to the present embodiment.

FIG. 6 is a schematic block diagram illustrating a configuration of the terminal device 1 according to the present embodiment. As illustrated in FIG. 6, the terminal device 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15, a radio resource control layer processing unit 16 and a selection unit 17. The radio transmission and/or reception unit 10 is also referred to as a transmission unit, a reception unit or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of a medium access control layer. The medium access control layer processing unit 15 controls transmission of a scheduling request based on various configuration information/parameters managed by the radio resource control layer processing unit 16.

The radio resource control layer processing unit 16 included in the higher layer processing unit 14 performs processing of a radio resource control layer. The radio resource control layer processing unit 16 manages the various configuration information/parameters of the terminal device 1 itself. The radio resource control layer processing unit 16 sets the various configuration information/parameters in accordance with a higher layer signaling received from the base station device 3. Specifically, the radio resource control layer processing unit 16 sets the various configuration information/parameters in accordance with the information indicating the various configuration information/parameters received from the base station device 3.

The selection unit 17 included in the higher layer processing unit 14 selects the PUCCH format 1 resource for the scheduling request. The selection unit 17 selects one or multiple PUCCH format 1 resources from the multiple PUCCH format 1 resources configured to a certain subframe. The selection unit 17 and a function of the selection unit 17 may be included in the radio transmission and/or reception unit 10 or the medium access control layer processing unit 15.

The radio transmission and/or reception unit 10 performs processing of the physical layer, such as modulation, demodulation, coding, and decoding. The radio transmission and/or reception unit 10 demultiplexes, demodulates, and decodes a signal received from the base station device 3, and outputs the information resulting from the decoding to the higher layer processing unit 14. The radio transmission and/or reception unit 10 modulates and codes data to generate a transmit signal, and transmits the transmit signal to the base station device 3.

The RF unit 12 converts (down-converts) a signal received through the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 performs Inverse Fast Fourier Transform (IFFT) on data, generates an SC-FDMA symbol, attaches a CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the final result via the antenna unit 11. Furthermore, the RF unit 12 amplifies power. Furthermore, the RF unit 12 may have a function of controlling transmit power. The RF unit 12 is also referred to as a "transmit power control unit".

Figure 7:
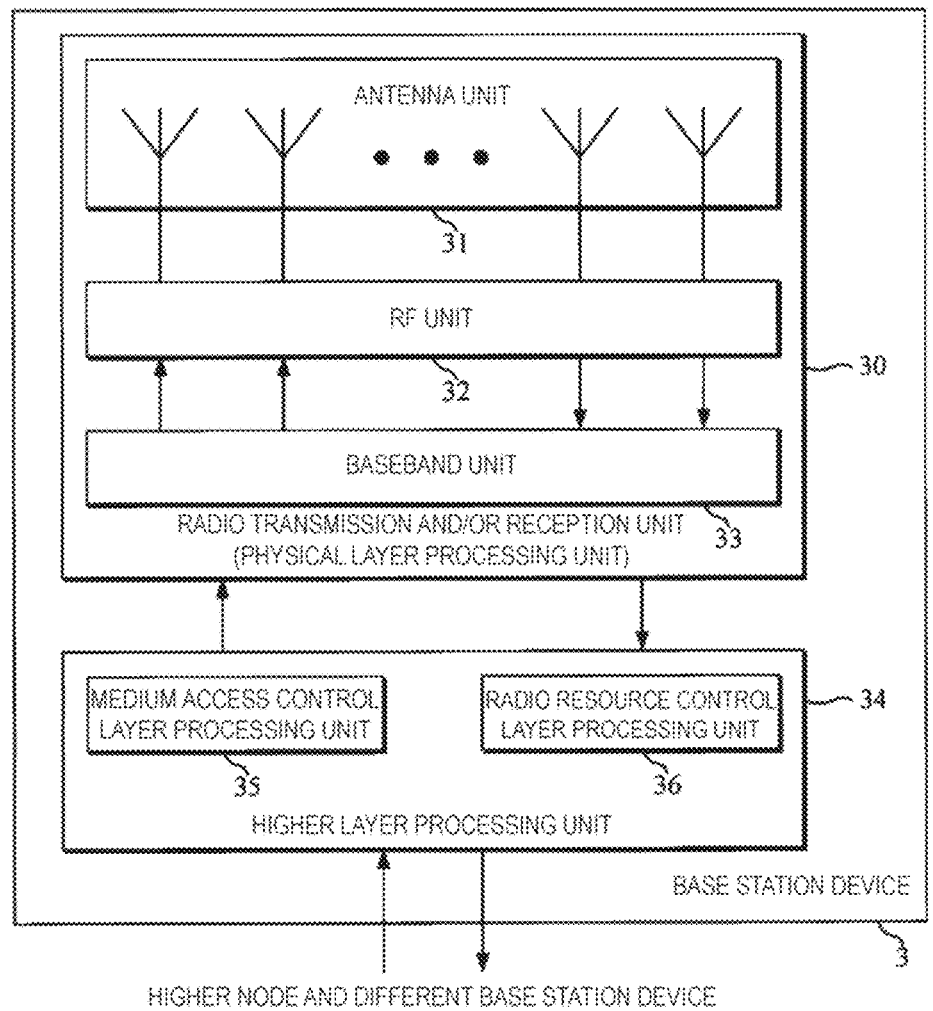
FIG. 7 is a schematic block diagram illustrating a configuration of a base station device 3 according to the present embodiment.

FIG. 7 is a schematic block diagram illustrating a configuration of the base station device 3 according to the present embodiment. As illustrated in FIG. 7, the base station device 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmission unit, a reception unit or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the medium access control layer. The medium access control layer processing unit 35 performs processing associated with a scheduling request based on various configuration information/parameters managed by the radio resource control layer processing unit 36.

The radio resource control layer processing unit 36 included in the higher layer processing unit 34 processes the radio resource control layer. The radio resource control layer processing unit 36 generates, or acquires from a higher node, downlink data (transport block) arranged on a physical downlink shared channel, system information, an RRC message, a MAC Control Element (CE), and the like, and outputs the generated or acquired data to the radio transmission and/or reception unit 30. Furthermore, the radio resource control layer processing unit 36 manages various configuration information/parameters for each of the terminal devices 1. The radio resource control layer processing unit 36 may set various configuration information/parameters for each of the terminal devices 1 via the higher layer signaling. In other words, the radio resource control layer processing unit 36 transmits/broadcasts information indicating various configuration information/parameters.

The functionality of the radio transmission and/or reception unit 30 is similar to that of the radio transmission and/or reception unit 10, and hence description thereof is omitted.

Various aspects of the terminal device according to the present embodiment will be described below.

(1) According to a first aspect of the present embodiment, the terminal device 1 includes: the selection unit 17 configured to select a physical uplink control channel resource used to transmit a scheduling request, from a first physical uplink control channel resource in a first subframe on a first serving cell, and a second physical uplink control channel resource in the first subframe on a second serving cell; the transmission unit 10 configured to transmit the scheduling request by using the selected physical uplink control channel resource and physical uplink control channel format 1 in the first subframe; and the medium access control layer processing unit 15 configured to instruct the transmission unit to transmit the scheduling request in the first subframe. In a case that a first physical uplink shared channel not including a transport block of the first serving cell in the first subframe is transmitted, and a second physical uplink shared channel not including a transport block of the second serving cell in the first subframe is not transmitted, the second physical uplink control channel resource in the first subframe on the second serving cell is selected as a physical uplink control channel resource used to transmit the scheduling request.

(2) According to the first aspect of the present embodiment, in a case that the first physical uplink shared channel not including the transport block in the first subframe on the first serving cell is transmitted, and the second physical uplink shared channel not including the transport block in the first subframe on the second serving cell is transmitted, one of the first physical uplink control channel resource and the second physical uplink control channel resource is selected as a physical uplink control channel used to transmit the scheduling request, and transmission of a physical uplink shared channel not including the transport block in a serving cell including a physical uplink control channel resource used to transmit the scheduling request is dropped in the first subframe.

(3) According to a second aspect of the present embodiment, the terminal device 1 includes: the selection unit 17 configured to select a physical uplink control channel resource used to transmit a scheduling request, from a first physical uplink control channel resource on a first serving cell in a first subframe, and a second physical uplink control channel resource on a second serving cell in the first subframe; the transmission unit 10 configured to, in a case that transmission of a first Hybrid Automatic Repeat reQuest ACKnowledgement (HARQ-ACK) which uses a prescribed physical uplink control channel format on the first serving cell, and transmission of a second HARQ-ACK which uses a prescribed physical uplink control channel format in the second serving cell do not take place in the first subframe, transmit the scheduling request by using the selected physical uplink control channel resource and physical uplink control channel format 1; and the medium access control layer processing unit 15 configured to instruct the transmission unit to transmit the scheduling request in the first subframe. In a case that transmission of the first HARQ-ACK which uses the prescribed physical uplink control channel format on the first serving cell, and transmission of the second HARQ-ACK which uses the prescribed physical uplink control channel format on the second serving cell take place in the first subframe, the scheduling request is multiplexed with the first HARQ-ACK transmitted by using the prescribed physical uplink control channel format in the first subframe on the first serving cell, and the second HARQ-ACK transmitted by using the prescribed physical uplink control channel format in the first subframe on the second serving cell.

(4) According to the second aspect of the present embodiment, the scheduling request multiplexed with the first HARQ-ACK, and the scheduling request multiplexed with the second HARQ-ACK are set to the same value. In this regard, the same value is associated with a positive scheduling request.

(5) According to the second aspect of the present embodiment, in a case that the transmission of the first HARQ-ACK which uses the prescribed physical uplink control channel format on the first serving cell, and the transmission of the second HARQ-ACK which uses the prescribed physical uplink control channel format in the second serving cell take place in the first subframe, the transmission of the scheduling request which uses the selected physical uplink control channel resource and physical uplink control channel format 1 is dropped in the first subframe.

(6) According to the second aspect of the present embodiment, the selection unit 17 selects the first physical uplink control channel resource in the first serving cell as a physical uplink control channel resource in the first subframe used to transmit a scheduling request in the first subframe, and in a case that the transmission of the first HARQ-ACK which uses the prescribed physical uplink control channel format in the first subframe on the first serving cell does not take place in the first subframe, and the transmission of the second HARQ-ACK which uses the prescribed physical uplink control channel format on the second serving cell takes place, the scheduling request is multiplexed with the second HARQ-ACK transmitted by using the prescribed physical uplink control channel format in the first subframe on the second serving cell, and the transmission of the scheduling request which uses the selected first physical uplink control channel resource in the first subframe and physical uplink control channel format 1 is dropped in the first serving cell.

(7) According to the second aspect of the present embodiment, one of the first serving cell and the second serving cell is a primary cell, and the other one of the first serving cell and the second serving cell is a secondary cell which is not the primary secondary cell.

(8) According to a third aspect of the present embodiment, the terminal device 1 includes: the reception unit 10 configured to receive information indicating a first physical uplink control channel resource on a first serving cell, and information indicating a second physical uplink control channel resource on a second serving cell; the transmission unit 10 configured to, in a case that transmission of a Hybrid Automatic Repeat request ACKnowledgement (HARQ-ACK) which uses a prescribed physical uplink control channel format does not take place in a first subframe, transmit the scheduling request by using one or both of the first physical uplink control channel resource and the second physical uplink control channel resource; and the medium access control layer processing unit 15 configured to instruct the transmission unit to transmit the scheduling request in the first subframe. The first serving cell is a primary cell. In a case that the first physical uplink control channel resource on the first serving cell is selected as a physical uplink control channel resource used to transmit the scheduling request in the first subframe, and the transmission of the HARQ-ACK which uses the prescribed physical uplink control channel format on the second serving cell takes place in the first subframe, whether the scheduling request is multiplexed with the HARQ-ACK transmitted by using the prescribed physical uplink control channel format on the second serving cell in the first subframe is based on whether the second serving cell is a primary secondary cell.

(9) According to the third aspect of the present embodiment, in a case that the first physical uplink control channel resource on the first serving cell is selected as a physical uplink control channel resource used to transmit the scheduling request in the first subframe, the transmission of the HARQ-ACK which uses the prescribed physical uplink control channel format on the second serving cell takes place in the first subframe, and the second serving cell is a primary secondary cell, the scheduling request is not multiplexed with the HARQ-ACK transmitted by using the prescribed physical uplink control channel format on the second serving cell in the first subframe, and is transmitted in the second subframe on the first serving cell. In a case that the first physical uplink control channel resource on the first serving cell is selected as a physical uplink control channel resource used to transmit the scheduling request in the first subframe, the transmission of the HARQ-ACK which uses the prescribed physical uplink control channel format on the second serving cell takes place in the first subframe, and the second serving cell is not a primary secondary cell, the scheduling request is multiplexed with the HARQ-ACK transmitted by using the prescribed physical uplink control channel format in the first subframe on the second serving cell, and is not transmitted by using the selected first physical uplink control channel resource in the first subframe on the first serving cell and physical uplink control channel format 1.

Consequently, the terminal device 1 can efficiently communicate with the base station device 3 by using multiple cells.

A program running on each of the base station device 3 and the terminal device 1 according to the present invention may be a program that controls a Central Processing Unit (CPU) and the like (a program for causing a computer to operate) in such a manner as to realize the functions according to the above-described embodiments of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD) and when necessary, is read by the CPU to be modified or rewritten.

Moreover, the terminal device 1 and the base station device 3 according to the above-described embodiments may be partially realized by the computer. This configuration may be realized by recording a program for realizing such control functions on a computer-readable medium and causing a computer system to read the program recorded on the recording medium for execution.

The "computer system" refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 3 according to the above-described embodiments can be realized as an aggregation (a device group) constituted of multiple devices. Devices constituting the device group may be each equipped with some or all portions of each function or each functional block of the base station device 3 according to the above-described embodiments. It is only required that the device group itself include general functions or general functional blocks of the base station device 3. Furthermore, the terminal device 1 according to the above-described embodiments can also communicate with the base station device as the aggregation.

Furthermore, the base station device 3 according to the above-described embodiments may be an Evolved Universal Terrestrial Radio Access Network (EUTRAN). Furthermore, the base station device 3 according to the above-described embodiments may have some or all portions of the function of a node higher than an eNodeB.

Furthermore, some or all portions of each of the terminal device 1 and the base station device 3 according to the above-described embodiments may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, the circuit integration technique is not limited to the LSI, and the integrated circuit may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal device is described as one example of a communication device, but the present invention is not limited to this, and can be applied to a fixed-type or a stationary-type electronic apparatus installed indoors or outdoors, for example, a terminal device or a communication device, such as an audio-video (AV) apparatus, a kitchen apparatus, a cleaning or washing machine, an air-conditioning apparatus, office equipment, a vending machine, an automobile, a bicycle, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

DESCRIPTION OF REFERENCE NUMERALS 1 (1A, 1B, 1C) Terminal device
3 Base station device
10 Radio transmission and/or reception unit
11 Antenna unit
12 RF unit
13 Baseband unit
14 Higher layer processing unit
15 Medium access control layer processing unit
16 Radio resource control layer processing unit
17 Selection unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal device comprising:
    selection circuitry configured to select a physical uplink control channel (PUCCH) resource used to transmit a scheduling request, from a first PUCCH resource in a first subframe in a first serving cell and a second PUCCH resource in the first subframe in a second serving cell; and
    transmission circuitry configured to transmit Hybrid Automatic Repeat reQuest ACKnowledgement (HARQ-ACK) by using a predetermined PUCCH format, in the first subframe in the first serving cell; wherein
        in a case that the PUCCH resource is selected in the first serving cell,
        the transmission circuitry is configured
            to transmit, in the first subframe in the first serving cell, the HARQ-ACK using the predetermined PUCCH format and the scheduling request, and
            not to transmit, in the first subframe in the second serving cell, the scheduling request using a PUCCH format 1, and
        in a case that the PUCCH resource is selected in the second serving cell,
        the transmission circuitry is configured to
            transmit, in the first subframe in the second serving cell, the HARQ-ACK using the predetermined PUCCH format and the scheduling request, and
            transmit, in the first subframe in the second serving cell, the scheduling request using the PUCCH format 1.

2. A communication method to be used by a terminal device, the method comprising the steps of:
    selecting a physical uplink control channel (PUCCH) resource used to transmit a scheduling request, from a first PUCCH resource in a first subframe in a first serving cell and a second PUCCH resource in the first subframe in a second serving cell; and
    transmitting Hybrid Automatic Repeat reQuest ACKnowledgement (HARQ-ACK) by using a predetermined PUCCH format, in the first subframe in the first serving cell; wherein
        in a case that the PUCCH resource is selected in the first serving cell,
            transmitting, in the first subframe in the first serving cell, the HARQ-ACK using the predetermined PUCCH format and the scheduling request, and
            not transmitting, in the first subframe in the second serving cell, the scheduling request using a PUCCH format 1, and
        in a case that the PUCCH resource is selected in the second serving cell,
            transmitting, in the first subframe in the second serving cell, the HARQ-ACK using the predetermined PUCCH format and the scheduling request, and
            transmitting, in the first subframe in the second serving cell, the scheduling request using the PUCCH format 1.

* * * * *